United States Patent
Lee et al.

(10) Patent No.: US 12,481,393 B2
(45) Date of Patent: Nov. 25, 2025

(54) DISPLAY DEVICE AND METHOD OF DRIVING THE SAME

(71) Applicant: SAMSUNG DISPLAY CO., LTD., Yongin-si (KR)

(72) Inventors: Choon Hyop Lee, Yongin-si (KR); Jang Hui Kim, Yongin-si (KR); Jae Won Kim, Yongin-si (KR); In Nam Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 47 days.

(21) Appl. No.: 18/544,799

(22) Filed: Dec. 19, 2023

(65) Prior Publication Data
US 2024/0361863 A1    Oct. 31, 2024

(30) Foreign Application Priority Data
Apr. 27, 2023  (KR) .......................... 10-2023-0055708

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05)

(58) Field of Classification Search
CPC .. G06F 3/04166; G06F 3/0446; G06F 3/0412; G06F 3/0443; G06F 3/0416; G06F 3/0448; G06F 3/047; G09G 3/20
See application file for complete search history.

(56) References Cited

U.S. PATENT DOCUMENTS

| | | | |
|---|---|---|---|
| 10,444,901 B2 | 10/2019 | Shin | |
| 11,175,766 B2* | 11/2021 | Seo | ........................ G06F 3/0416 |
| 11,257,452 B2* | 2/2022 | Kim | ........................ G06F 3/041 |
| 11,502,141 B2 | 11/2022 | Lee et al. | |
| 2015/0378509 A1* | 12/2015 | Choi | ..................... G06F 3/0412 |
| | | | 345/173 |
| 2016/0195990 A1* | 7/2016 | Han | ....................... G06F 1/3262 |
| | | | 345/173 |
| 2016/0283023 A1* | 9/2016 | Shin | ....................... A61M 5/178 |
| 2016/0349903 A1* | 12/2016 | Yun | ........................ G06F 3/0412 |
| 2017/0228096 A1* | 8/2017 | Nathan | ............. G06F 3/041661 |
| 2017/0285817 A1* | 10/2017 | Mori | ..................... G06F 3/0446 |

(Continued)

FOREIGN PATENT DOCUMENTS

| KR | 10-2019-0070149 | 6/2019 |
|---|---|---|
| KR | 10-2019-0141490 | 12/2019 |

(Continued)

*Primary Examiner* — Ibrahim A Khan
(74) *Attorney, Agent, or Firm* — F. CHAU & ASSOCIATES, LLC

(57) ABSTRACT

A display device includes: a touch panel including a touch area including first touch electrodes and second touch electrodes; and a touch panel driver for providing touch driving signals to the first touch electrodes. The touch panel driver provides the touch driving signals to the first touch electrodes in a first touch sensing period of a first mode, operates in a second mode when the first touch is detected, and provides the touch driving signals to the first touch electrodes disposed in a first row area of the touch area in which the first touch is detected in a second touch sensing period of the second mode.

21 Claims, 32 Drawing Sheets

(56) References Cited

U.S. PATENT DOCUMENTS

| | | | |
|---|---|---|---|
| 2018/0095587 A1* | 4/2018 | Kurasawa | G06F 3/0445 |
| 2018/0113523 A1* | 4/2018 | Hara | G06F 3/0446 |
| 2019/0138123 A1* | 5/2019 | Jung | G06F 3/044 |
| 2019/0179475 A1* | 6/2019 | Seo | G06F 3/0442 |
| 2020/0064941 A1* | 2/2020 | Chang | G06F 3/044 |
| 2020/0064942 A1* | 2/2020 | Chang | G06F 3/0383 |
| 2020/0210022 A1* | 7/2020 | Kim | G06F 3/0418 |
| 2020/0285385 A1* | 9/2020 | Cheng | G06F 3/0418 |
| 2020/0310618 A1* | 10/2020 | Azumi | G06F 3/0446 |
| 2021/0200413 A1* | 7/2021 | Jang | G06F 3/04182 |
| 2021/0365168 A1* | 11/2021 | Jeon | G06F 3/04166 |
| 2022/0019327 A1* | 1/2022 | So | G06F 3/04162 |
| 2022/0057882 A1* | 2/2022 | Lee | G06F 3/0416 |
| 2022/0179520 A1* | 6/2022 | Jeon | G06F 3/0446 |
| 2022/0187938 A1* | 6/2022 | Han | G06F 3/04162 |
| 2023/0315228 A1* | 10/2023 | Kim | G06F 3/0446 345/174 |
| 2023/0367425 A1* | 11/2023 | Jang | G06F 3/0446 |
| 2024/0160317 A1* | 5/2024 | Jang | G06F 3/0441 |
| 2024/0256061 A1* | 8/2024 | Kim | G06F 3/0412 |
| 2025/0037654 A1* | 1/2025 | Kozuma | G09F 9/30 |

FOREIGN PATENT DOCUMENTS

| | | |
|---|---|---|
| KR | 10-2021-0123454 | 10/2021 |
| KR | 10-2533513 | 5/2023 |

* cited by examiner

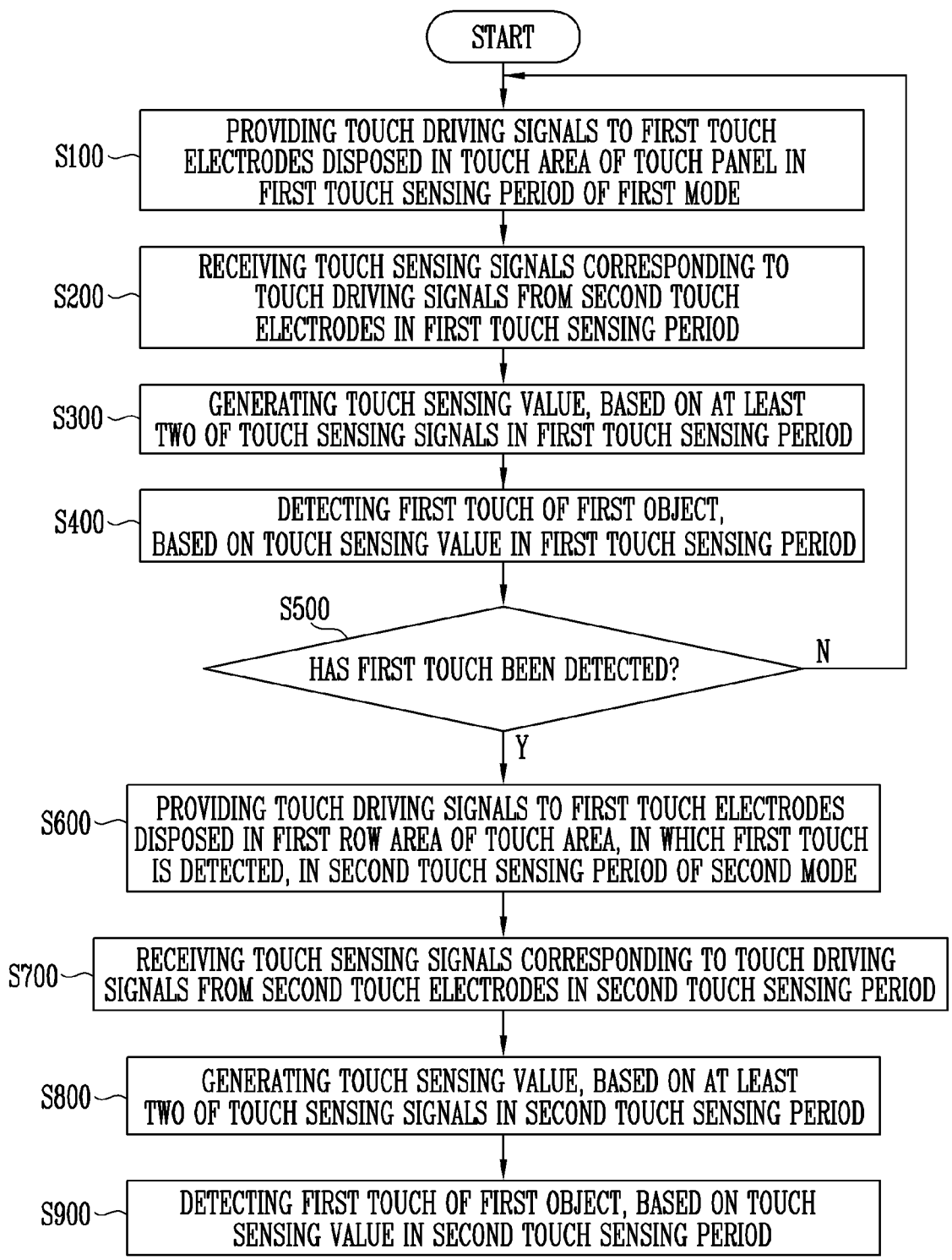

DISPLAY DEVICE AND METHOD OF DRIVING THE SAME

CROSS-REFERENCE TO RELATED APPLICATION

The present U.S. patent application claims priority under 35 U.S.C. § 119(a) to Korean patent application No. 10-2023-0055708 filed on Apr. 27, 2023 in the Korean Intellectual Property Office, the disclosure of which is incorporated by reference in its entirety herein.

1. TECHNICAL FIELD

The present disclosure generally relates to a display device and a method of driving the same, and more particularly, to a display device including a touch panel and a method of driving the same.

2. DISCUSSION OF RELATED ART

A touch panel mounted in an electronic device is capable of indicating a position through a touch. Touch panels are widely used in mobile electronic devices such as smartphones and tablet computers. Since touch panels are widely used, techniques for increasing the accuracy of touch detection and the response speed to a touch are needed.

Noise of a signal generated by a touch may decrease the accuracy of touch detection. In addition, the response speed to a touch can be increased by increasing the touch report rate of a touch panel. However, it is technically difficult to simultaneously satisfy a low influence of noise and a high touch report rate.

SUMMARY

Embodiments provide a display device for simultaneously satisfying a low influence of noise and a high touch report rate.

Embodiments also provide a method of driving the display device.

In accordance with an aspect of the present disclosure, there is provided a display device including: a touch panel and a touch panel driver. The touch panel includes a touch area including first touch electrodes and second touch electrodes. The touch panel driver is configured to provide touch driving signals to the first touch electrodes, receive touch sensing signals corresponding to the touch driving signals from the second touch electrodes, generate a touch sensing value based on at least two of the touch sensing signals, and detect a first touch of a first object based on the touch sensing value. The touch panel driver provides the touch driving signals to the first touch electrodes in a first touch sensing period of a first mode, operates in a second mode when the first touch is detected, and provides the touch driving signals to the first touch electrodes disposed in a first row area of the touch area in which the first touch is detected in a second touch sensing period of the second mode.

The touch panel driver may provide the touch driving signals to a first portion of the first touch electrodes in a first period of the first touch sensing period, and provide the touch driving signals to a second portion different from the first portion of the first touch electrodes in a second other period of the first touch sensing period.

The touch panel driver may sequentially provide the touch driving signals to the first portion of the first touch electrodes disposed in the first row area and the first portion of the first touch electrodes disposed in a second row area different from the first row area in the first period of the first touch sensing period, and sequentially provide the touch driving signals to the second portion of the first touch electrodes disposed in the first row area and the second portion of the first touch electrodes disposed in the second row area in the second period of the first touch sensing period.

A first frame period of the first mode may include an uplink period and the first touch sensing period. A second frame period subsequent to the first frame period of the first mode may include a processing period in which the touch sensing value is processed.

The touch panel driver may detect a second touch of a second object in the uplink period.

The touch panel driver may receive an uplink sensing signal corresponding to an output signal output by the second object from at least one of the first touch electrodes and the second touch electrodes, and detect the second touch of the second object based on the uplink sensing signal.

The touch panel driver may provide the touch driving signals to a first portion of the first touch electrodes disposed in the first row area in a first period of the second touch sensing period, and provide the touch driving signals to a second portion different from the first portion of the first touch electrodes disposed in the first row area in a second other period of the second touch sensing period.

The touch panel driver may sequentially provide the touch driving signals to the first portion of the first touch electrodes disposed in a (1-1)th row area included in the first row area and the first portion of the first touch electrodes disposed in a (1-2)th row area different from the (1-1)th row area, which is included in the first row area, in the first period of the second touch sensing period, and sequentially provide the touch driving signals to the second portion of the first touch electrodes disposed in the (1-1)th row area and the second portion of the first touch electrodes disposed in the (1-2)th row area in the second period of the second touch sensing period.

A first frame period of the second mode may include an uplink period, the second touch sensing period, and a processing period in which the touch sensing value is processed.

A number of the first touch electrodes simultaneously receiving the touch driving signals in the second touch sensing period may be smaller than a number of the first touch electrodes simultaneously receiving the touch driving signals in the first touch sensing period.

A first frame period of the second mode may include the second touch sensing period and a self-sensing period. The touch panel driver may provide self-sensing signals to the first touch electrodes disposed in the first row area and the second touch electrodes disposed in a first column area of the touch area in which the first touch is detected in the self-sensing period, and detect the first touch of the first object based on a variation of the self-sensing signals.

The touch panel driver may provide the self-sensing signals to the first touch electrodes disposed in the first row area in a first period of the self-sensing period, and provide the self-sensing signals to the second touch electrodes disposed in the first column area in a second period of the self-sensing period.

A first frame period of the second mode may include a noise sensing period. The touch panel driver may provide a noise driving signal to at least one first touch electrode among the first touch electrodes which are not disposed in the first row area, receive a noise sensing signal corresponding to the noise driving signal from at least one second touch electrode among the second touch electrodes, and detect noise of the at least one second touch electrode based on the noise sensing signal.

The touch panel driver may detect the noise of the at least one second touch electrode, based on a difference between the noise driving signal and the noise sensing signal.

In accordance with another aspect of the present disclosure, there is provided a display device including: a touch panel and a touch panel driver. The touch panel includes a touch area including first touch electrodes and second touch electrodes. The touch panel driver is configured to provide self-sensing signals to the first touch electrodes and the second touch electrodes, detect a first touch of a first object based on a variation of the self-sensing signals, provide touch driving signals to the first touch electrodes, receive touch sensing signals corresponding to the touch driving signals from the second touch electrodes, generate a touch sensing value based on at least two of the touch sensing signals, and detect the first touch based on the touch sensing value. The touch panel driver provides the self-sensing signals to the first touch electrodes and the second touch electrodes of the touch area in a self-sensing period of a first mode, operates in a second mode when the first touch is detected, and provides the touch driving signals to the first touch electrodes disposed in a first row area of the touch area in which the first touch is detected in a second touch sensing period of the second mode.

The touch panel driver may provide the self-sensing signals to the first touch electrodes in a first period of the self-sensing period, and provide the self-sensing signals to the second touch electrodes in a second other period of the self-sensing period.

In accordance with still another aspect of the present disclosure, there is provided a method of driving a display device, the method including: providing touch driving signals to first touch electrodes disposed in a touch area of a touch panel in a first touch sensing period of a first mode; receiving touch sensing signals corresponding to the touch driving signals from second touch electrodes in the first touch sensing period; generating a touch sensing value, based on at least two of the touch sensing signals in the first touch sensing period; detecting a first touch of a first object, based on the touch sensing value in the first touch sensing period; operating in a second mode when the first touch is detected; providing the touch driving signals to the first touch electrodes disposed in a first row area of the touch area in which the first touch is detected in a second touch sensing period of the second mode; receiving the touch sensing signals corresponding to the touch driving signals from the second touch electrodes in the second touch sensing period; generating the touch sensing value, based on at least two of the touch sensing signals in the second touch sensing period; and detecting the first touch of the first object, based on the touch sensing value in the second touch sensing period.

The providing of the touch driving signals in the second touch sensing period may include: providing the touch driving signals to a first portion of the first touch electrodes disposed in the first row area in a first period of the second touch sensing period; and providing the touch driving signals to a second portion different from the first portion of the first touch electrodes disposed in the first row area in a second other period of the second touch sensing period.

A first frame period of the first mode may include an uplink period and the first touch sensing period. A second frame period subsequent to the first frame period of the first mode may include a processing period in which the touch sensing value is processed.

A first frame period of the second mode may include an uplink period, the second touch sensing period, and a processing period in which the touch sensing value is processed.

BRIEF DESCRIPTION OF THE DRAWINGS

FIG. 36 is a flowchart illustrating a method of driving a display device in accordance with an embodiment of the present disclosure.

DETAILED DESCRIPTION

Figure 1:
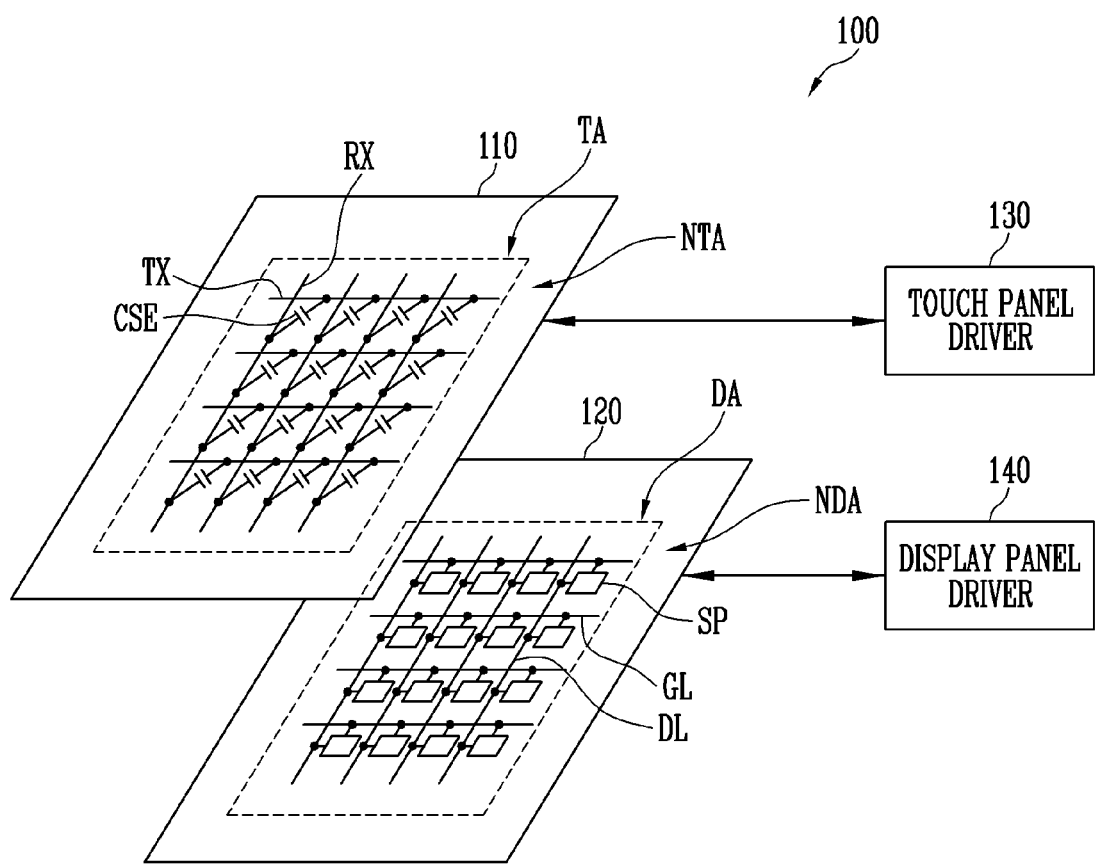
FIG. 1 is a view illustrating a display device in accordance with an embodiment of the present disclosure.

Hereinafter, embodiments of the present disclosure will be described in more detail with reference to the accompanying drawings. In the description below, only a necessary part to understand an operation according to the present disclosure is described and the descriptions of other parts are omitted so as not to unnecessarily obscure the present disclosure. In addition, the present disclosure is not limited to exemplary embodiments described herein, but may be embodied in various different forms. Rather, exemplary embodiments described herein are provided to thoroughly and completely describe the disclosed contents and to sufficiently transfer the ideas of the disclosure to a person of ordinary skill in the art.

In the entire specification, when an element is referred to as being "connected" or "coupled" to another element, it can be directly connected or coupled to the another element or be indirectly connected or coupled to the another element with one or more intervening elements interposed therebetween. The technical terms used herein are used only for the purpose of illustrating a specific embodiment and not intended to limit the embodiment. It will be understood that when a component "includes" an element, unless there is another opposite description thereto, it should be understood that the component does not exclude another element but may further include another element. It will be understood that for the purposes of this disclosure, "at least one of X, Y, and Z" can be construed as X only, Y only, Z only, or any combination of two or more items X, Y, and Z (e.g., XYZ, XYY, YZ, ZZ). Similarly, for the purposes of this disclosure, "at least one selected from the group consisting of X, Y, and Z" can be construed as X only, Y only, Z only, or any combination of two or more items X, Y, and Z (e.g., XYZ, XYY, YZ, ZZ).

It will be understood that, although the terms "first", "second," etc. may be used herein to describe various elements, these elements should not be limited by these terms. These terms are only used to distinguish one element from another element. Thus, a "first" element discussed below could also be termed a "second" element without departing from the teachings of the present disclosure.

Spatially relative terms, such as "below," "above," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

In addition, the embodiments of the disclosure are described here with reference to schematic diagrams of ideal embodiments (and an intermediate structure) of the present disclosure, so that changes in a shape as shown due to, for example, manufacturing technology and/or a tolerance may be expected. Therefore, the embodiments of the present disclosure are not limited to the specific shapes of a region shown here, but include shape deviations caused by, for example, the manufacturing technology. The regions shown in the drawings are schematic in nature, and the shapes thereof may not represent the actual shapes of the regions of the device, and do not limit the scope of the disclosure.

FIG. 1 is a view illustrating a display device 100 in accordance with an embodiment of the present disclosure.

Referring to FIG. 1, the display device 100 may include a touch panel 110, a display panel 120, a touch panel driver 130 (e.g., a first driver circuit), and a display panel driver 140 (e.g., a second driver circuit).

In FIG. 1, it is illustrated that the touch panel 110 and the display panel 120 are separated from each other. However, this is merely for purpose of functionally distinguishing the touch panel 110 and the display panel 120 in the display device 100. For example, the touch panel 100 may be formed through a process separate from a process through which the display panel 120 is formed such that the touch panel 110 and the display panel 120 are coupled to each other. For example, the touch panel 110 may be attached and coupled to one surface of the display panel 120. That is, the touch panel 110 may be formed as an add-on type touch panel. Alternatively, the touch panel 110 may be formed with the display panel 120 through one process (e.g., a process of manufacturing the display panel 120). That is, the touch panel 110 may be formed as an in-cell type touch panel.

The touch panel 110 may be provided on one surface of the display panel 120. For example, the touch panel 110 may be disposed on one surface (e.g., an upper surface) selected from both surfaces of the display panel 120. The one surface is a surface in a direction in which an image is displayed. In another embodiment, the touch panel 110 may be directly formed on at least one surface selected from both the surfaces of the display panel 120, or be formed inside the display panel 120. For example, the touch panel 110 may be directly formed on an outer surface of an upper substrate or a lower substrate of the display panel (i.e., an upper surface of the upper substrate or a lower surface of the lower substrate), or be directly formed on an inner surface of the upper substrate (i.e., a lower surface of the upper substrate) or an inner surface of the lower substrate (i.e., an upper surface of the lower substrate).

The touch panel 110 may include a touch area TA capable of sensing a touch and a non-touch area NTA disposed outside of the touch area TA (e.g., a peripheral area or an edge area of the touch area TA). In an embodiment, the touch area TA is disposed to correspond to a display area DA of the display panel 120.

In an embodiment, at least one area of the touch panel 110 overlaps with the display panel 120. For example, the touch area TA of the touch panel 110 may be disposed on the display area DA of the display panel 120. In an embodiment, at least one electrode for detecting a touch may be disposed in the touch area TA. The at least one electrode for detecting a touch may include a first touch electrode TX and a second touch electrode RX. The first touch electrode TX and the second touch electrode RX may be provided on the display area DA of the display panel 120.

Lines for electrically connecting the at least one electrode provided in the touch area TA to the touch panel driver 130 may be disposed in the non-touch area NTA. For example, lines for electrically connecting the first touch electrode TX and the second touch electrode RX to the touch panel driver 130 may be disposed in the non-touch area NTA. The non-touch area NTA may be disposed to correspond to a non-display area NDA of the display panel 120.

The touch panel 110 may include at least one first touch electrode TX and at least one second touch electrode RX, which are provided in the touch area TA. For example, the touch panel 110 may include a first touch electrode TX and a second touch electrode RX intersecting the first touch electrode TX. In some embodiments, the first touch electrode TX may extend along a first direction, and the second touch electrode RX may extend along a second direction intersecting the first direction while being insulated from the first touch electrode TX by an insulating layer (not shown). A capacitor CSE may be formed between the first touch electrode TX and the second touch electrode RX. A capacitance between the first touch electrode TX and the second touch electrode RX may be changed when a touch occurs at a corresponding point or the periphery thereof. Therefore, the touch panel driver 130 may detect a change in capacitance between the first touch electrode TX and the second touch electrode RX, thereby sensing a touch.

However, the present disclosure is not limited to the shape, size, and/or arrangement direction of the first touch electrode TX and the second touch electrode RX.

The display panel 120 may include the display area DA and the non-display area NDA located at an outside of the display area DA (e.g., an edge area or a peripheral area of the display area DA).

A gate line GL and a data line DL may be disposed in the display area DA, and a sub-pixel SP electrically connected to the gate line GL and the data line DL is disposed in the display area DA. Lines for supplying various driving signals and/or power, used to drive the sub-pixel SP, may be provided in the non-display area NDA.

However, the present disclosure is not limited to the kind of the display panel 120. For example, the display panel 120 may be a self-luminous display panel. For example, the display panel 120 may include a plurality of light emitting elements. For example, the light emitting element may be an organic light emitting diode. For example, the light emitting element may be an inorganic light emitting diode such as a micro light emitting diode (LED) or a quantum dot LED. For example, the display panel 120 may be a non-light emitting display panel such as a Liquid Crystal Display (LCD) panel, an Electro-Phoretic Display (EPD) panel, or an Electro-Wetting Display (EWD) panel. When the display panel 120 is a non-light emitting display panel, the display device 100 may further include a backlight unit for supplying light to the display panel 120.

The touch panel driver 130 may be connected to the touch panel 110 to transmit a signal input to the touch panel 110 or to receive a signal output from the touch panel 110. The touch panel driver 130 may supply a touch driving signal to the touch panel 110 and then receive a touch sensing signal corresponding to the touch driving signal from the touch panel 110, thereby detecting a touch. To this end, the touch panel driver 130 may include a touch driving signal transmitter and a touch sensing signal receiver. In an embodiment, the touch driving signal transmitter and the touch sensing signal receiver may be integrated into one Integrated Circuit (IC), but the present disclosure is not limited thereto. In an embodiment, the touch panel driver 130 (e.g., the touch driving signal transmitter) may simultaneously (or sequentially) supply a touch driving signal to a plurality of first touch electrodes TX. The touch panel driver 130 (e.g., the touch sensing signal receiver) may receive a touch sensing signal from a plurality of second sensing electrode RX. The touch panel driver 130 may receive a touch sensing signal from the touch panel 110, and perform signal processing on the touch sensing signal, thereby detecting whether a touch has been input and/or a coordinate of the touch.

The display panel driver 140 may be connected to the display panel 120 to supply a signal input to the display panel 120 or to receive a signal output from the display panel 120. The display panel driver 140 may supply a gate signal to the gate line GL, and supply a data voltage to the data line DL.

Figure 2:
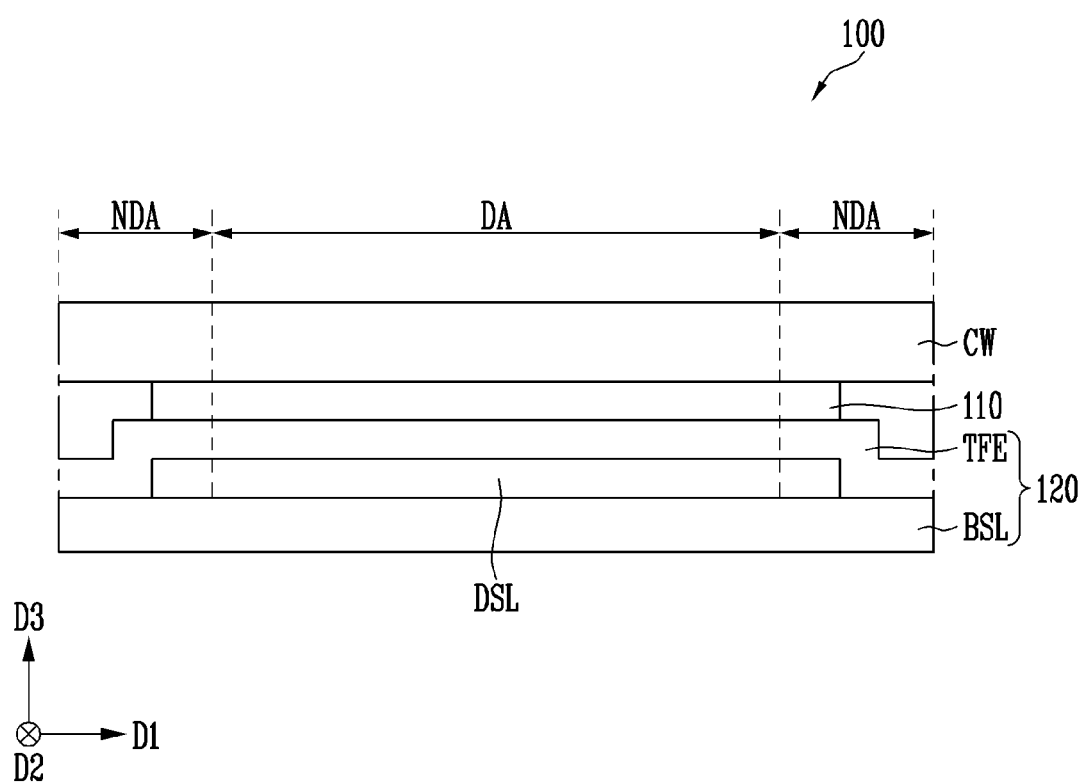
FIG. 2 is a sectional view illustrating an example of the display device shown in FIG. 1.

FIG. 2 is a sectional view illustrating an example of the display device 100 shown in FIG. 1.

Referring to FIG. 2, the display device 100 may include a display panel 120 and a touch panel 110 disposed on the display panel 120. A cover window CW may be disposed on the touch panel 110.

FIG. 2 illustrates that the display panel 120 is a self-luminous display panel including a light emitting element. However, the display panel 120 is not limited to being a self-luminous display panel.

The display panel 120 may include a first base substrate BSL, an element layer DSL, and an encapsulation layer TFE.

The first base substrate BSL may support the element layer DSL. The first base substrate BSL may include an insulative material. The insulative material may include, for example, at least one of glass, quartz, ceramic, and plastic. The first base substrate BSL may be a rigid substrate. In some embodiments, the first base substrate BSL may be a flexible substrate.

The element layer DSL may be located on the first base substrate BSL (e.g., in a third direction D3). The element layer DSL may include a sub-pixel (see SP shown in FIG. 1) and a signal line, which are located on the first base substrate BSL. The sub-pixel may include a thin film transistor (TFT) and a capacitor. In an embodiment, the sub-pixel may include a light emitting element electrically connected to the TFT and/or the capacitor. The signal line may include a gate line configured to transfer a gate signal to each sub-pixel and a data line configured to transfer a data voltage. The sub-pixel included in the element layer DSL may be disposed in the display area DA. A common electrode (e.g., a cathode electrode of the light emitting element, a common electrode of a liquid crystal display device, or the like) may be formed in the element layer DSL.

The encapsulation layer TFE may be disposed on the element layer DSL. The encapsulation layer TFE may protect the element layer DSL from external moisture and/or external oxygen. The encapsulation layer TFE may include two or more thin film layers formed on the element layer DSL. For example, the encapsulation layer TFE may include an inorganic thin film layer formed on the element layer DSL, an organic thin film layer formed on the inorganic thin film layer, and an inorganic thin film layer disposed on the organic thin film layer. In an embodiment, the encapsulation layer TFE may be formed as a glass substrate to cover the element layer DSL. The encapsulation layer TFE may cover the element layer DSL in the display area DA and the non-display area NDA.

The touch panel 110 may be disposed on the encapsulation layer TFE. In an embodiment, the touch panel 110 may be formed directly on the encapsulation layer TFE. In an embodiment, the touch panel 110 may be formed through a process separate from a process through which the display panel 120 is formed, to be disposed (e.g., attached) on the encapsulation layer TFE. The touch panel 110 may have a touch area (see TA shown in FIG. 1) in at least a portion of an area overlapping with the display area DA. The touch panel 110 may have a non-touch area (see NTA shown in FIG. 1) in at least a portion of an area overlapping with the non-display area NDA.

The cover window CW may be disposed on the touch panel 110. The cover window CW may protect the display panel 120 and the touch panel 110 from external impact or the like. The cover window CW may be implemented with a light transmissive (e.g., transparent) material, e.g., a film made of glass and/or plastic.

In an embodiment, the display device 100 may further include one or more optical layers (e.g., an anti-glare layer, a polarizing plate, a color filter, liquid crystals, and the like).

Figure 3:
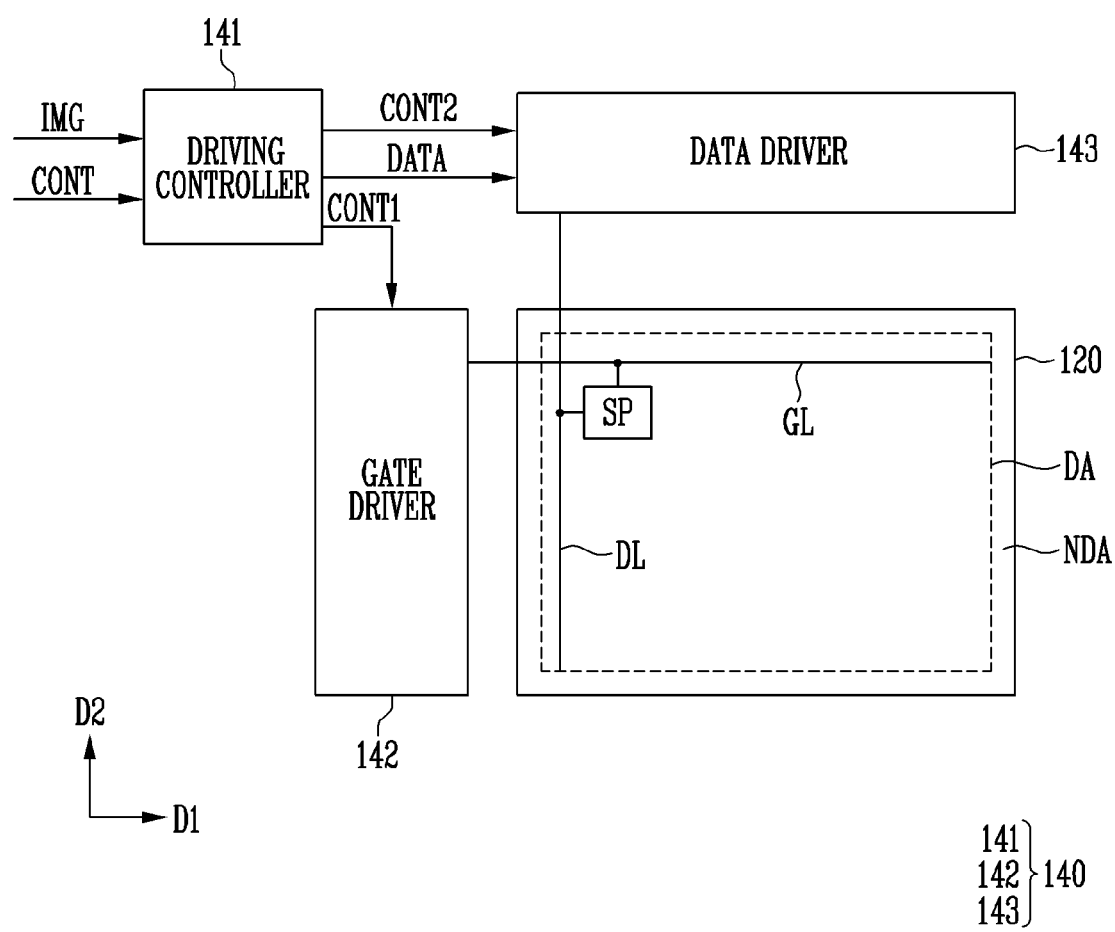
FIG. 3 is a block diagram illustrating an example of a display panel and a display panel driver, which are shown in FIG. 1.

FIG. 3 is a block diagram illustrating an example of the display panel 120 and the display panel driver 140, which are shown in FIG. 1.

Referring to FIG. 3, the display device may include a display panel 120 and a display panel driver 140. The display panel driver 140 may include a driving controller 141 (e.g., a controller circuit), a gate driver 142 (e.g., a first driver circuit), and a data driver 143 (e.g., a second driver circuit). In an embodiment, the driving controller 141 and the data driver 143 are integrated into a single chip.

The display panel 120 may include a display area DA in which an image is displayed and a non-display area NDA disposed adjacent to the display area DA. In an embodiment, the gate driver 142 is mounted in the non-display area NDA.

The display panel 120 may include a plurality of gate lines GL, a plurality of data lines DL, and a plurality of sub-pixels SP electrically connected to the gate lines GL and the data lines DL. The date lines GL may extend in a first direction D1, and the data lines DL may extend in a second direction D2 intersecting the first direction D1.

The driving controller 141 may receive input image data IMG and an input control signal CONT from a main processor (e.g., a graphic processing unit (GPU) or the like). For example, the input image data IMG may include red image data, green image data, and blue image data. In an embodiment, the input image data IMG may further include white image data. In another example, the input image data IMG may include magenta image data, yellow image data, and cyan image data. The input image data CONT may include a master clock signal and a data enable signal. The input control signal CONT may further include a vertical synchronization signal and a horizontal synchronization signal.

The driving controller 141 may generate a first control signal CONT1, a second control signal CONT2, and a data signal DATA, based on the input image data IMG and the input control signal CONT.

The driving controller 141 may generate the first control signal CONT1 for controlling an operation of the gate driver 142, based on the input control signal CONT, and output the first control signal CONT1 to the gate driver 142. The first control signal CONT1 may include a vertical start signal and a gate clock signal.

The driving controller 141 may generate the second control signal CONT2 for controlling an operation of the data driver 143, based on the input control signal CONT, and output the second control signal CONT2 to the data driver 143. The second control signal CONT2 may include a horizontal start signal and a load signal.

The driving controller 141 may generate the data signal DATA by receiving the input image data IMG and the input control signal CONT. The driving controller 141 may output the data signal DATA to the data driver 143.

The gate driver 142 may generate gate signals for driving the gate lines GL in response to the first control signal CONT1 input from the driving controller 141. The gate driver 142 may output the gate signals to the gate lines GL. For example, the gate driver 142 may sequentially output the gate signals to the gate lines GL.

The data driver 143 may receive the second control signal CONT2 and the data signal DATA, which are input from the driving controller 141. The data driver 143 may generate data voltages obtained by converting the data signal DATA into a voltage in an analog form. The data driver 143 may output the data voltages to the data lines DL.

Figure 4:
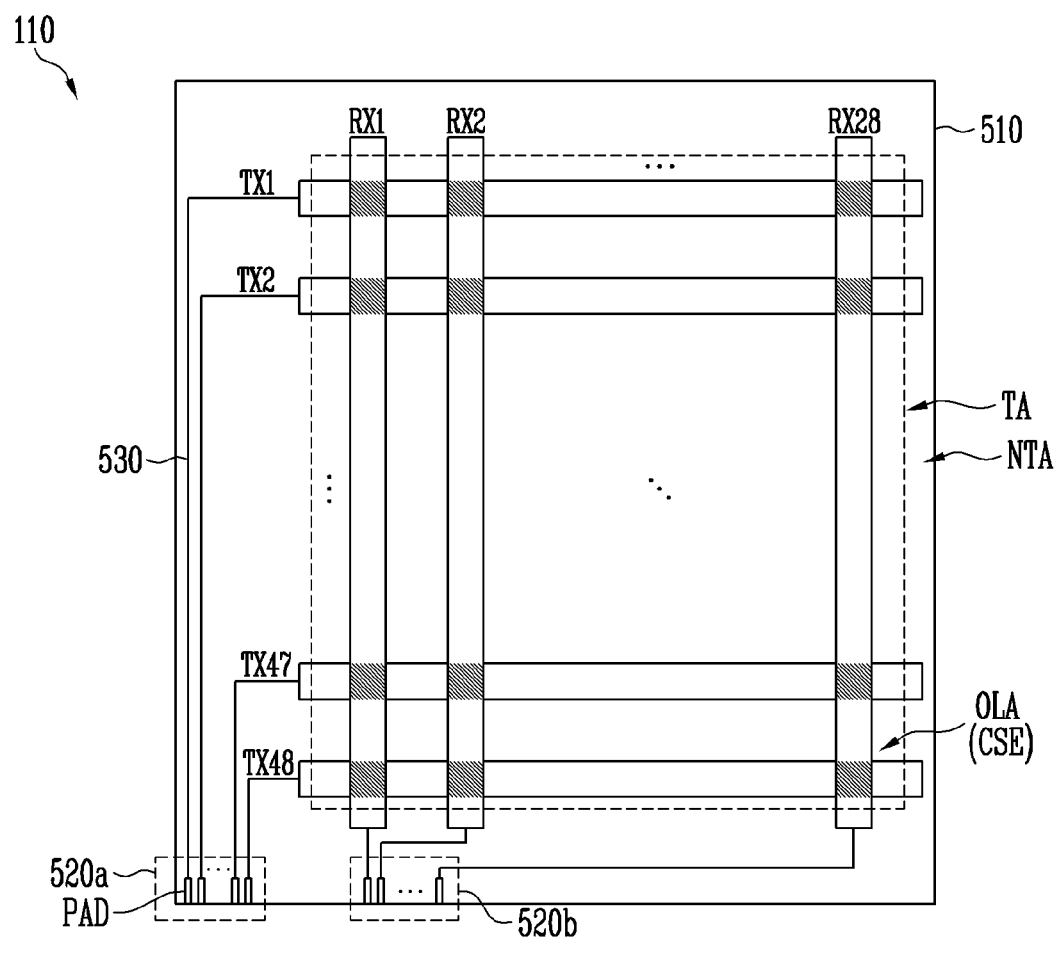
FIG. 4 is a block diagram illustrating an example of a touch panel shown in FIG. 1.

FIG. 4 is a block diagram illustrating an example of the touch panel 110 shown in FIG. 1.

Referring to FIG. 4, the touch panel 110 may include a second base substrate 510, first touch electrodes TX1 to TX48, second touch electrodes RX1 to RX28, a pad part 520, and lines 530.

The second base substrate 510 is a substrate which is a base of the touch panel 110, and may be a rigid or flexible substrate. For example, the second base substrate 510 may be a rigid substrate including glass or tempered glass, or a flexible substrate including a thin film made of flexible plastic. The first touch electrodes TX1 to TX48, the second touch electrode RX1 to RX28, the pad part 520, and the lines 530 may be disposed on the second base substrate 510. In an embodiment, the second base substrate 510 may be omitted (or be replaced with another component). For example, when the first touch electrodes TX1 to TX48 and the second touch electrode RX1 to RX28 are formed directly on the display panel (120 shown in FIG. 1), the second base substrate 510 may be replaced with the above-described first base substrate (BSL shown in FIG. 2) or the above-described encapsulation layer (TFE shown in FIG. 2).

The first touch electrodes TX1 to TX48 may extend in the first direction D1. For example, each of the first touch electrodes TX1 to TX48 may be disposed in the touch panel 110 to extend in a row direction. While FIG. 4 illustrates 48 first touch electrodes, the present disclosure is not limited thereto since fewer or more than 48 first touch electrodes may be present in alternate embodiments.

The second touch electrodes RX1 to RX28 may extend in the second direction D2 intersecting the first direction D1. For example, each of the second touch electrodes RX1 to RX28 may be disposed in the touch panel 110 to extend in a column direction. While FIG. 4 illustrates 28 second touch electrodes, the present disclosure is not limited thereto since fewer or more than 28 second touch electrodes may be present in alternate embodiments.

The touch panel 110 may be driven using a mutual capacitance method. In the mutual capacitance method, any one of the first touch electrodes TX1 to TX48 and the second touch electrodes RX1 to RX28 may serve as a touch driving electrode, and another of the first touch electrodes TX1 to TX48 and the second touch electrodes RX1 to RX28 may serve as a touch sensing electrode. A touch driving signal may be input to the touch driving electrode, and a touch sensing signal may be output to the touch sensing electrode. In an embodiment, the first touch electrodes TX1 to TX48 may receive a touch driving signal for touch driving, and the second touch electrodes RX1 to RX28 may output a touch sensing signal corresponding to the touch driving signal. In an embodiment, the second touch electrodes RX1 to RX28 may receive a touch driving signal, and the first touch electrodes TX1 to TX48 may output a touch sensing signal corresponding to the touch driving signal. Hereinafter, for convenience of description, a case where a touch driving signal is input to the first touch electrodes TX1 to TX48 and the second touch electrodes RX1 to RX28 output a touch sensing signal is described as an example, but the present disclosure is not limited thereto.

A capacitor CSE may be formed between each of the first touch electrodes TX1 to TX48 and each of the second touch electrodes RX1 to RX28. The first touch electrode TX and the second touch electrode RX may be disposed while overlapping with each other in a vertical direction (e.g., the third direction D3 intersecting the first direction D1 and the second direction D2) in an overlapping area OLA. In the overlapping area OLA, the first touch electrode TX may serve as one electrode of the capacitor CSE, and the second touch electrode RX may serve as the other electrode of the capacitor CSE. A capacitance may be formed between the first touch electrode TX and the second touch electrode RX in the overlapping area OLA. When a first object (e.g., a finger of a person, or the like) approaches toward the touch panel 110, the capacitance between the first touch electrode TX and the second touch electrode RX may be changed. The touch panel driver (130 shown in FIG. 1) may detect whether a touch has been input and/or a coordinate of the touch, based on the changed capacitance.

The pad part 520 may include one or more pads PAD. The pads PAD may connect the first touch electrodes TX1 to TX48 and the second touch electrodes RX1 to RX28 to the touch panel driver (130 shown in FIG. 1). For example, a touch driving signal may be input to the first touch electrodes TX1 to TX48 through a first pad part 520a. For example, a touch sensing signal may be output from the second touch electrodes RX1 to RX28 through a second pad part 520b.

The lines 530 may electrically connect the pads PAD and the first touch electrodes TX1 to TX48 or electrically connect the pads PAD and the second touch electrodes RX1 to RX28.

The pad part 520 and the lines 530 may be disposed in the non-touch area NTA.

In this embodiment, it has been exemplified that the number of the first touch electrodes TX1 to TX48 is 48 and the number of the second touch electrodes RX1 to RX28 is 28. However, the present disclosure is not limited to the number of the first touch electrodes TX1 to TX48 and the number of the second touch electrodes RX1 to RX28.

Figure 5:
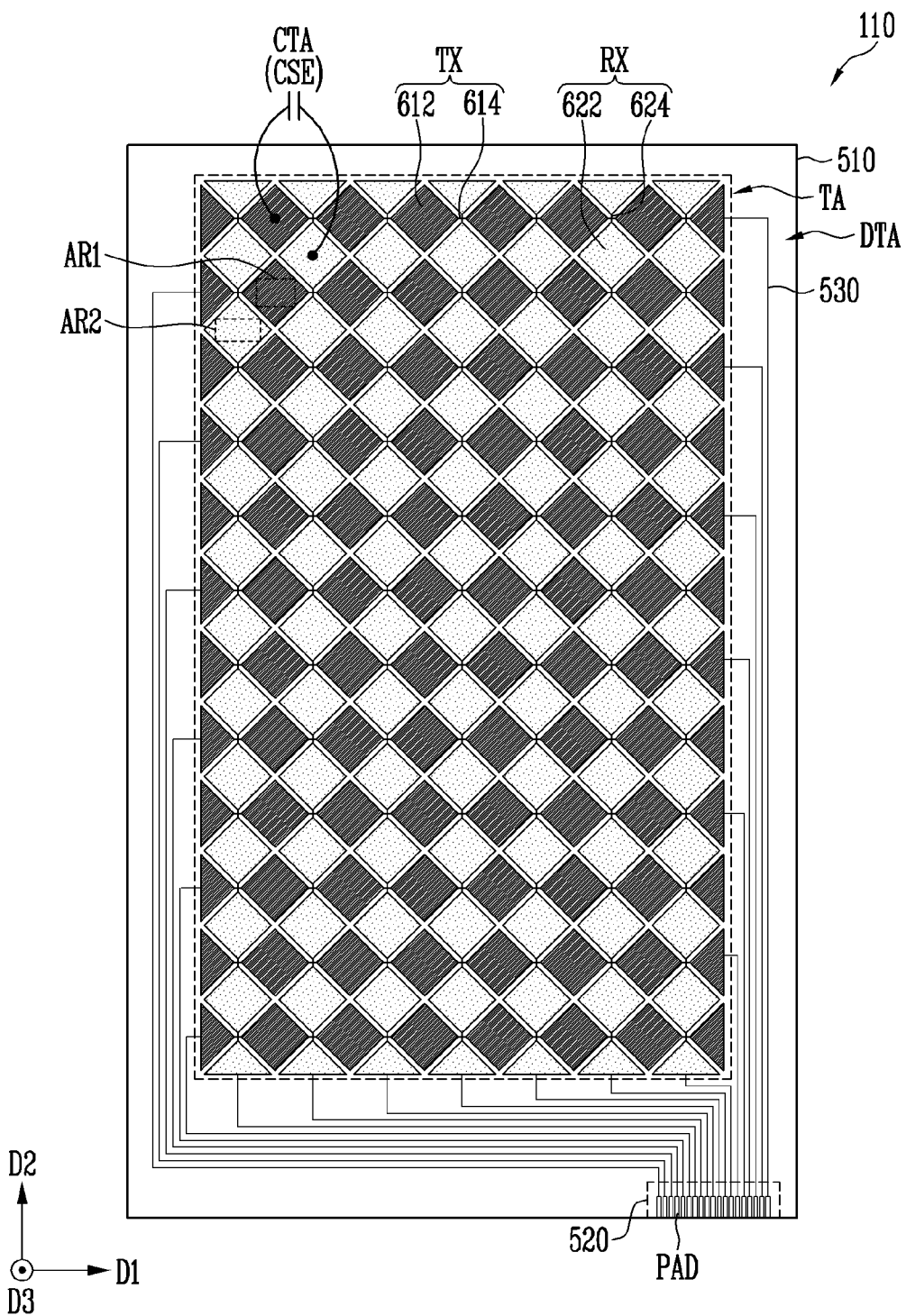
FIG. 5 is a view illustrating an example of the touch panel shown in FIG. 1.

FIG. 5 is a view illustrating an example of the touch panel 110 shown in FIG. 1.

For convenience of description, FIG. 5 illustrates a case where the number of first touch electrodes TX is 12 and the number of second touch electrodes RX is 7. For example, a column of the touch panel 110 is illustrated as having 12 first touch electrodes TX and a row of the touch panel 110 is illustrated as having 7 second touch electrodes RX.

The first touch electrode TX of the touch panel 110 may include a first sensing cell 612 and a first connection electrode 614. The second touch electrode RX of the touch panel 110 may include a second sensing cell 622 and a second connection electrode 624.

The first touch electrode TX may extend along a row direction (e.g., the first direction D1). A first touch electrode TX disposed in each row may include a plurality of first sensing cells 612 and a first connection electrode 614 configured to connect the plurality of first sensing cells 612 to each other. In an embodiment, the first connection electrode 614 is integrally configured with the first sensing cell 612. For example, a single layer may be used to form the first connection electrode 614 and the first sensing cell 612. In an embodiment, the first connection electrode 614 has a bridge-shaped connection pattern or is bridge-shaped.

The second touch electrode RX may extend along a column direction (e.g., the second direction D2). A second touch electrode RX disposed in each column may include a plurality of second sensing cells 622 and a second connection electrode 624 configured to connect the plurality of second sensing cells 622 to each other. In an embodiment, the second connection electrode 624 is integrally configured with the second sensing cell 612. For example, a single layer may be used to form the second connection electrode 624 and the second sensing cell 622. In an embodiment, the second connection electrode 624 is a bridge-shaped connection pattern or is bridge-shaped.

The first connection electrode 614 and the second connection electrode 624 may be located while overlapping with each other in the vertical direction (e.g., the third direction D3). The first connection electrode 614 and the second connection electrode 624 may be insulated from each other by an insulating layer (not shown).

A capacitor CSE may be formed between the first touch electrode TX and the second touch electrode RX. For example, the first touch electrode TX may serve as one electrode of the capacitor CSE, and the second touch electrode RX adjacent to the first touch electrode TX may serve as the other electrode of the capacitor CSE. The capacitor CSE may be formed in an adjacent area CTA between the first touch electrode TX and the second touch electrode RX. Air (e.g., the atmosphere) between the first touch electrode TX and the second touch electrode RX may serve as an insulating material of the capacitor CSE. Accordingly, whether a touch has been input and/or a coordinate of the touch can be detected using a mutual capacitance method.

Figure 6A:
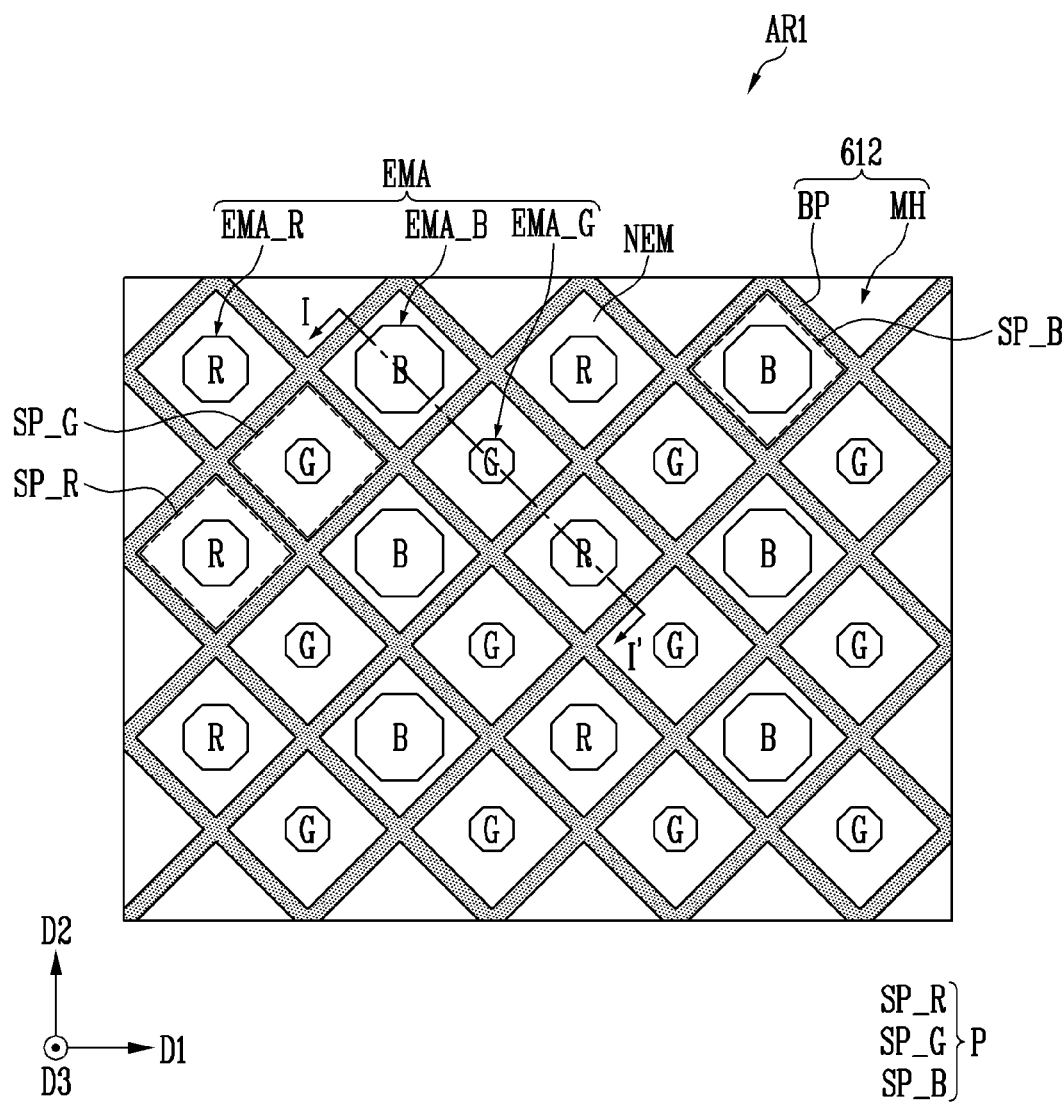
FIG. 6A is an enlarged view of a first area shown in FIG. 5.

FIG. 6A is an enlarged view of a first area AR1 shown in FIG. 5.

A pixel P may include a plurality of sub-pixels SP. Each of the sub-pixels SP may include an emission area EMA and a non-emission area NEM. The pixel P may include a first sub-pixel SP_R, a second sub-pixel SP_G, and a third sub-pixel SP_B.

The emission area EMA is an area in which light can be emitted. For example, in an embodiment in which the sub-pixel SP includes a light emitting element, the emission area EMA may correspond to an area in which the light emitting element is located.

The non-emission area NEM may be located at the periphery (e.g., an edge area) of the emission area EMA. The sub-pixels SP may be distinguished from each other by the non-emission area NEM. In an embodiment, a pixel driving circuit for driving the light emitting element may be located in at least a portion of an area overlapping with the non-emission area NEM. In an embodiment, the non-emission area NEM may correspond to an area in which a pixel defining layer or a black matrix are located. The emission area EMA and the non-emission area NEM may constitute the display area (DA shown in FIG. 1).

The first sub-pixel SP_R may emit light in a first wavelength band (e.g., a red wavelength band). The second sub-pixel SP_G may emit light in a second wavelength band (e.g., a green wavelength band). The third sub-pixel SP_B may emit light in a third wavelength band (e.g., a blue wavelength band). The red wavelength band may be a wavelength band of about 600 nm to about 750 nm, the green wavelength band may be a wavelength band of about 480 nm to about 560 nm, and the blue wavelength band may be a wavelength band of about 370 nm to about 460 nm.

For convenience of description, it is assumed and described that the first sub-pixel SP_R is a red sub-pixel emitting light in the red wavelength band, the second sub-pixel SP_G is a green sub-pixel emitting light in the green wavelength band, and the third sub-pixel SP_B is a blue sub-pixel emitting light in the blue wavelength band. However, the present disclosure is not limited thereto.

In the pixel P, the sub-pixel SP may be arranged in various manners. For example, as shown in FIG. 6A, first and third sub-pixels SP_R and SP_B may be alternately arranged along a row direction (e.g., the first direction D1), and second sub-pixels SP_G may be arranged along a row adjacent to the first and third sub-pixels SP_R and SP_B. The second sub-pixels SP_G may be disposed to be dislocated with the first and third sub-pixels SP_R and SP_B.

An area of an emission area EMA of any one of the first sub-pixel SP_R, the second sub-pixel SP_G, and the third sub-pixel SP_B may be different from areas of the other two sub-pixels. For example, an area of an emission area EMA_B of the third sub-pixel SP_B may be greater than an area of an emission area EMA_R of the first sub-pixel SP_R. For example, the area of the emission area EMA_R of the first sub-pixel SP_R may be greater than an area of an emission area EMA_G of the second sub-pixel SP_G. However, the present disclosure is not limited thereto. For example, the areas of the emission areas EMA of the first sub-pixel SP_R, the second sub-pixel SP_G, and the third sub-pixel SP_B may be designed to be the same.

The shape of the emission area EMA may be variously designed. For example, referring to FIG. 6A, it is illustrated that the shape of the emission area EMA is an octagonal shape. However, the emission area EMA may have a shape such as a circular shape, another polygonal shape, or a polygonal shape having round corners.

The first sensing cell 612 may include a mesh hole MH and a body part BP.

The mesh hole MH may overlap with the emission area EMA in a thickness direction (e.g., the third direction D3). In an embodiment, an emission area EMA of the pixel P is located in an area corresponding to the mesh hole MH. An area of the mesh hole MH may be greater than an area of the emission area EMA.

The body part BP may overlap with the non-emission area NEM in the thickness direction (e.g., the third direction D3. A width of the body part BP may be smaller than a width of the non-emission area NEM.

Through the above-described structure, light output from the emission area EMA of the sub-pixel SP can be effectively transmitted through the first touch electrode TX.

Figure 6B:
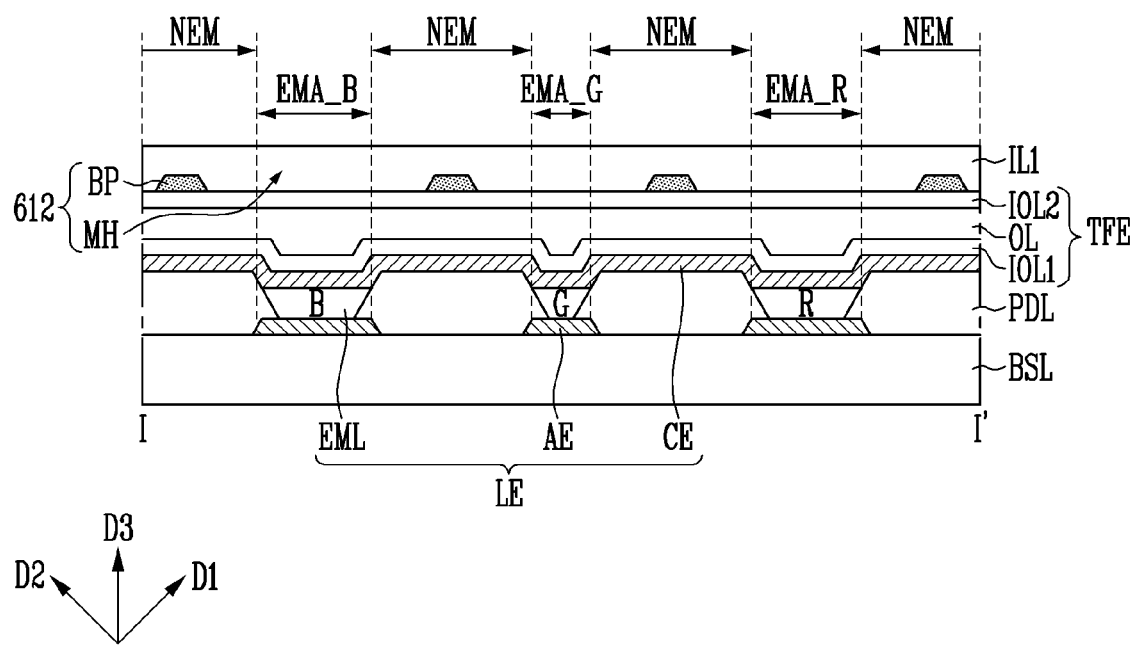
FIG. 6B is a sectional view taken along line I-I' shown in FIG. 6A.

FIG. 6B is a sectional view taken along line I-I' shown in FIG. 6A.

Referring to FIG. 6B, a pixel defining layer PDL, a light emitting element EL, an encapsulation layer TFE, a first sensing cell 612, and a first insulating layer IL1 may be located on a first base substrate BSL. The pixel defining layer PDL and the light emitting element LE may be included in the above-described element layer (DSL shown in FIG. 2). The first sensing cell 612 and the first insulating layer IL1 may be included in the above-described touch panel (110 shown in FIG. 2).

The light emitting element LE may include a first electrode AE, a second electrode CE, and a light emitting layer EML. The light emitting layer EML is located between the first electrode AE and the second electrode CE. The light emitting element LE may be disposed for each sub-pixel SP.

The first electrode AE may be disposed for each sub-pixel SP. The pixel defining layer PDL exposing the first electrode AE may be disposed over the first electrode AE. The first electrode AE may correspond to an anode electrode of the light emitting element LE. The first electrode AE may include a metal layer such as silver (Ag), magnesium (Mg), aluminum (Al), platinum (Pt), palladium (Pd), gold (Au), nickel (Ni), neodymium (Nd), iridium (Ir), chromium (Cr) or any alloy thereof, and/or indium tin oxide (ITO), indium zinc oxide (IZO), zinc oxide (ZnO), or indium tin zinc oxide (ITZO).

The pixel defining layer PDL may be located while overlapping with the non-emission area NEM. The pixel defining layer PDL may include an organic insulating layer including an organic material. At least one of acrylic resin, epoxy resin, a phenolic resin, polyamide resin, and polyimide resin may be selected as the organic material. The pixel defining layer PDL may include a light absorption material. A light absorber may be formed on the pixel defining layer PDL, to absorb light introduced from the outside. For example, the pixel defining layer PDL may include a carbon-based black pigment. However, the present disclosure is not limited thereto, and the pixel defining layer PDL may include an opaque metal material such as chromium (Cr), molybdenum (Mo), an alloy (MoTi) of molybdenum and titanium, tungsten (W), vanadium (V), niobium (Nb), tantalum (Ta), manganese (Mn), cobalt (Co) or nickel (Ni), which has a high light absorption rate.

The light emitting layer EML may be disposed while overlapping with an area in which the first electrode AE is exposed as at least a portion of the pixel defining layer PDL is removed. The light emitting layer EML may include an organic light emitting layer. According to an organic material included in the light emitting layer EML, the light emitting layer EML may emit light in the first wavelength band (e.g., the red wavelength band), emit light in the second wavelength band (e.g., the green wavelength band), or emit light in the third wavelength band (e.g., the blue wavelength band).

The second electrode CE may be disposed on the light emitting layer EML (e.g., in the third direction DR3). The second electrode CE may be entirely formed in the emission area EMA and the non-emission area NEM. For example, the second electrode CE may overlap both the emission area EMA and the non-emission area NEM. The second electrode CE may correspond to a cathode electrode of the light emitting element LE. The second electrode CE may include a metal layer such as silver (Ag), magnesium (Mg), aluminum (Al), platinum (Pt), palladium (Pd), gold (Au), nickel (Ni), neodymium (Nd), iridium (Ir), chromium (Cr) or any alloy thereof, and/or a light transmissive conductive layer such as indium tin oxide (ITO), indium zinc oxide (IZO), zinc oxide (ZnO), or indium tin zinc oxide (ITZO). For example, the second electrode CE may be provided as a multi-layer including at least two layers including a thin metal layer. For example, the second electrode CE may include a triple-layer of ITO/Ag/ITO.

In an embodiment, the light emitting element LE may further include a hole transport layer disposed between the first electrode AE and the light emitting layer EML and an electron transport layer disposed between the second electrode CE and the light emitting layer EML.

The encapsulation layer TFE may be located on the second electrode CE (e.g., in the third direction D3). The encapsulation layer TFE may have a stacked structure in which an inorganic material, an organic material, and an inorganic material are sequentially formed. Referring to FIG. 6B, the encapsulation layer TFE may be formed as a first inorganic encapsulation layer IOL1 including an inorganic material, an organic encapsulation layer OL including an organic material, and a second inorganic encapsulation layer IOL2 including an inorganic material are sequentially formed. The encapsulation layer TFE may perform a function of protecting the light emitting element LE (e.g., the light emitting layer EML) from external moisture and/or external oxygen.

A body part BP of the first sensing cell 612 may be disposed on the encapsulation layer TFE. The first insulating layer IL1 is located over the body part BP. For example, the first insulating layer IL1 may cover the body part BP.

Referring to FIGS. 4 and 6B, the first insulating layer IL1 may insulate touch electrodes from each other. The plurality of first touch electrodes TX1 to TX48 may be insulated from each other by the first insulating layer IL1. The plurality of second touch electrodes RX1 to RX28 may be insulated from each other by the first insulating layer IL1.

Referring to FIGS. 5 and 6B, the first connection electrode 614 and the second connection electrode 624 may be insulated from each other by the first insulating layer IL1. For example, the first connection electrode 614 and the second connection electrode 624 may be located while overlapping with each other in the thickness direction (e.g., the third direction D3) with the first insulating layer IL1 interposed therebetween.

A mesh hole MH of the first sensing cell 612 may be located while overlapping with the emission area EMA.

Figure 7A:
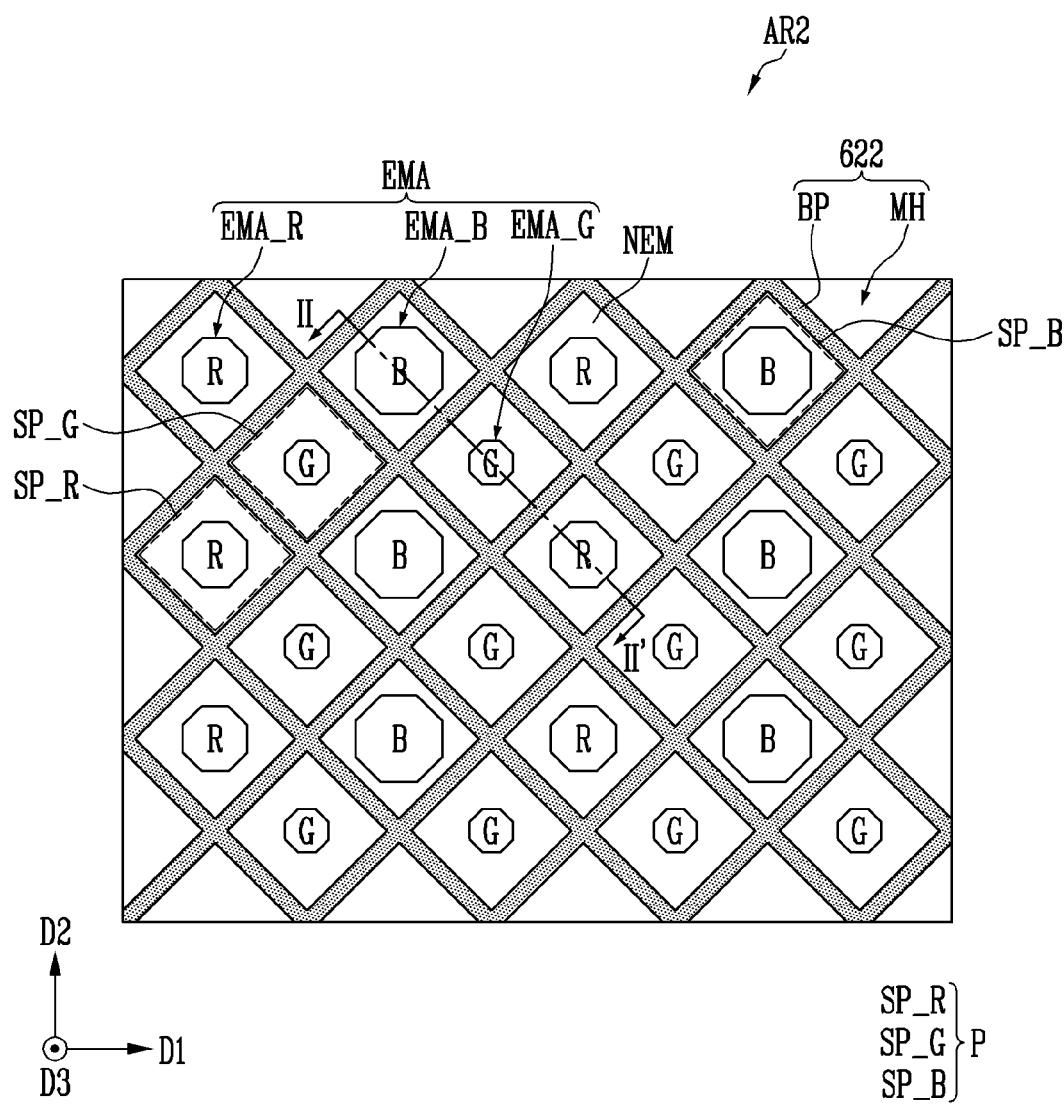
FIG. 7A is an enlarged view of a second area shown in FIG. 5.

FIG. 7A is an enlarged view of a second area AR2 shown in FIG. 5.

Referring to FIGS. 6A and 7A, the descriptions of the first sensing cell 612 may be entirely applied to descriptions of the second sensing cell 622. The second sensing cell 622 may include a body part BP and a mesh hole MH. Descriptions of the other components are the same as described above in FIG. 6A.

Figure 7B:
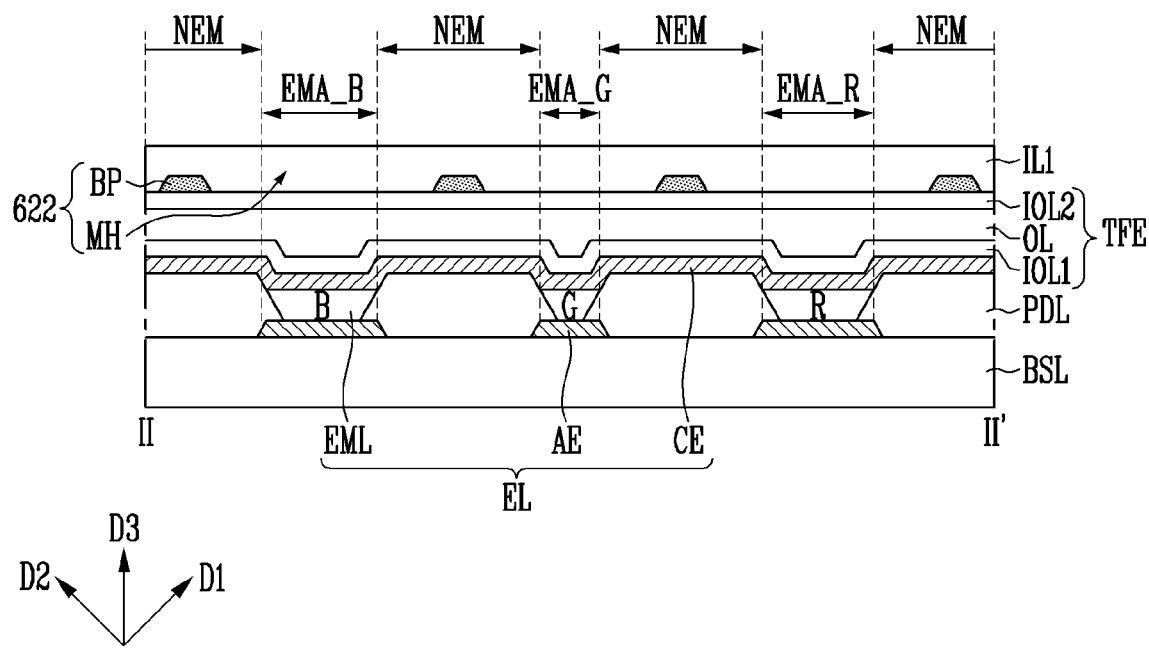
FIG. 7B is a sectional view taken along line II-II' shown in FIG. 7A.

FIG. 7B is a sectional view taken along line II-II' shown in FIG. 7A.

Referring to FIGS. 6B and 7B, the descriptions of the first sensing cell 612 may be entirely applied to descriptions of the second sensing cell 622. The body part BP of the second sensing cell 622 may be covered by the first insulating layer IL1. In an embodiment, the body part BP of the second sensing cell 622 may be disposed on the first insulating layer IL1.

Figure 8:
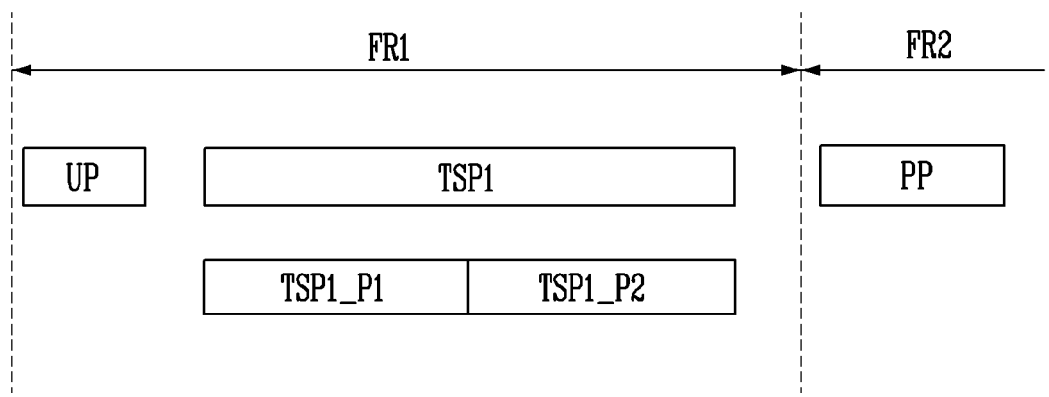
FIG. 8 is a diagram illustrating an example in which the display device shown in FIG. 1 operates in a first mode.
Figure 9:
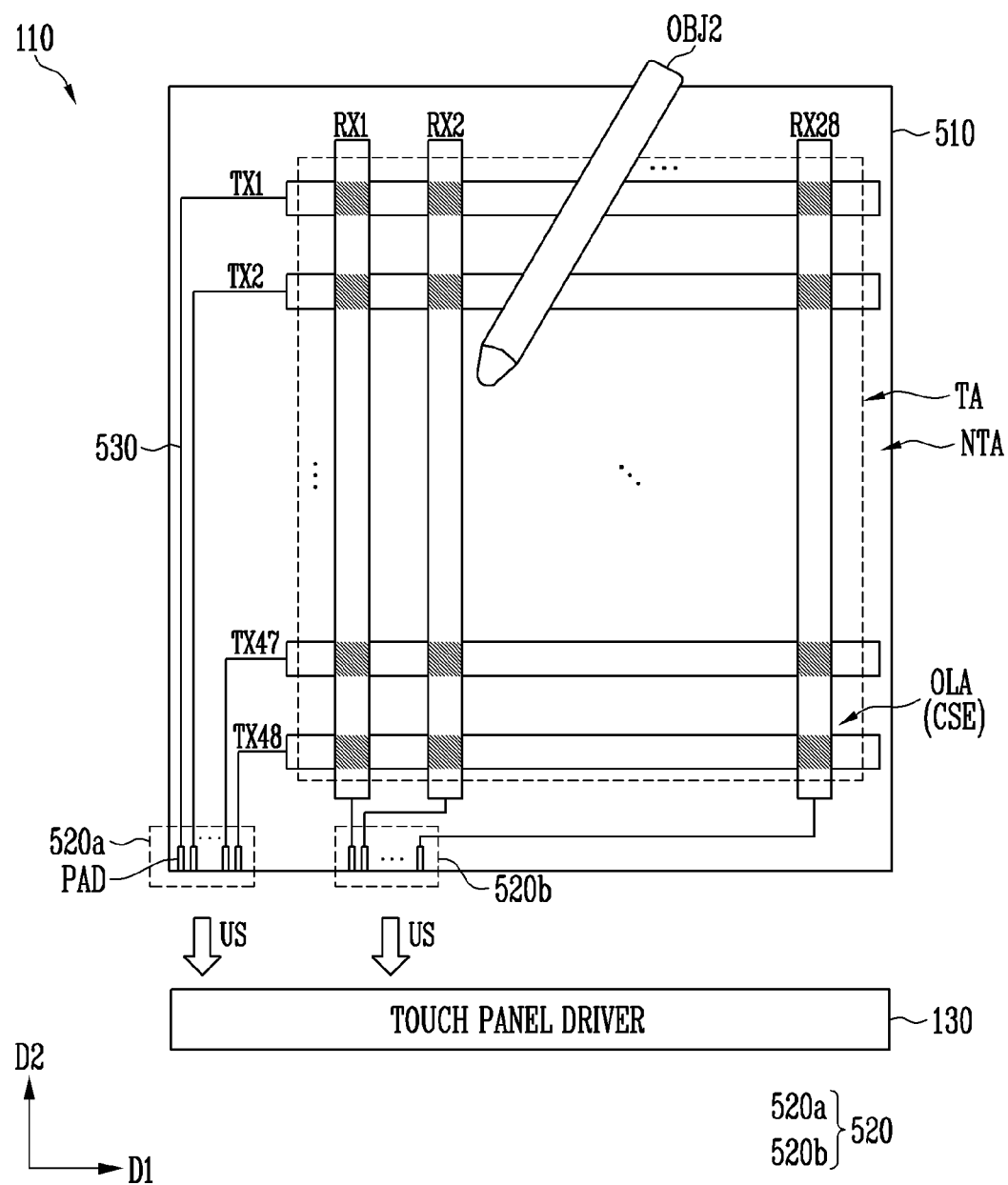
FIG. 9 is a diagram illustrating an example in which the display device shown in FIG. 1 operates in an uplink period.
Figure 10:
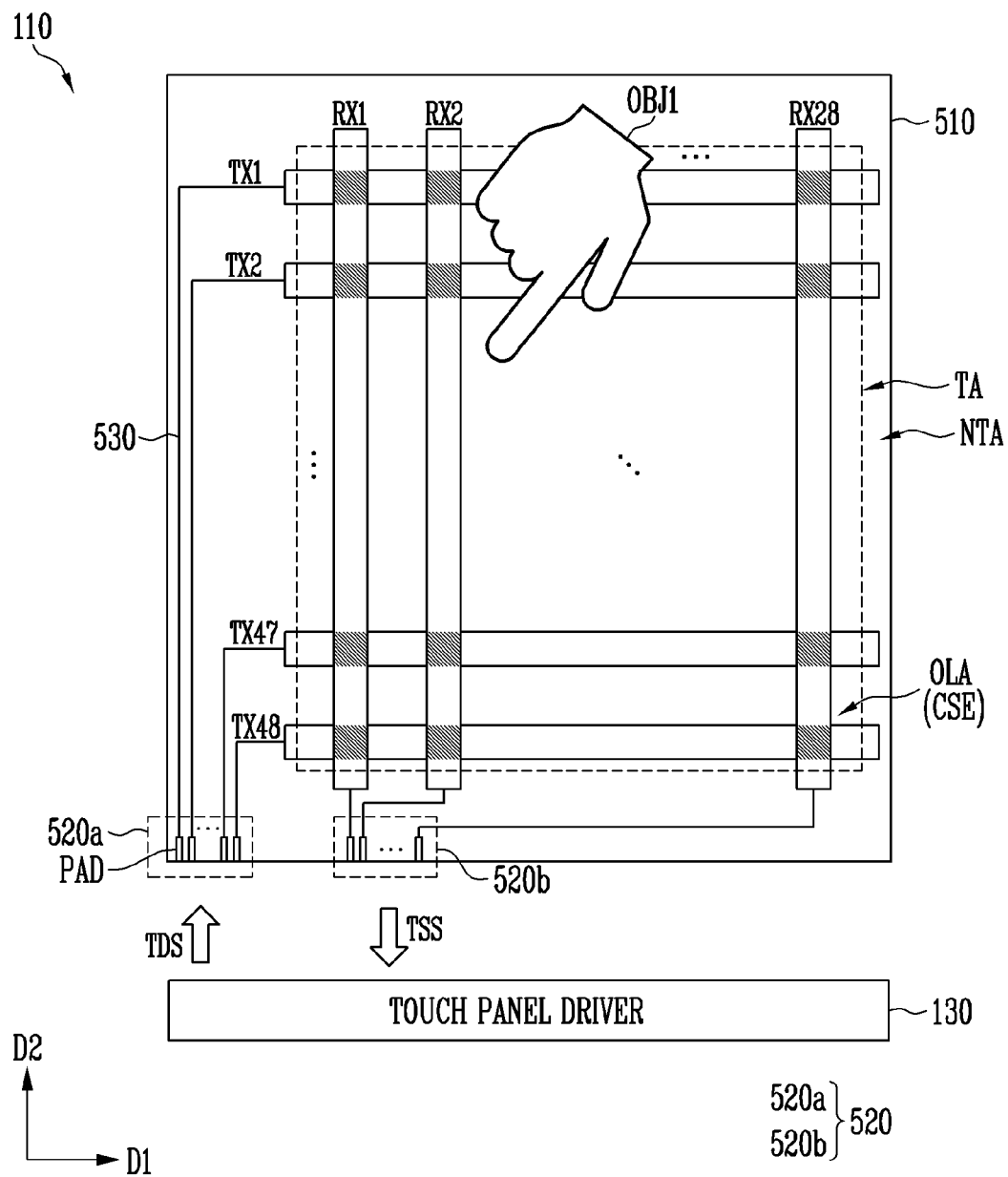
FIG. 10 is a diagram illustrating an example in which the display device shown in FIG. 1 operates in a first touch sensing period.

FIG. 8 is a diagram illustrating an example in which the display device 100 shown in FIG. 1 operates in a first mode. FIG. 9 is a diagram illustrating an example in which the display device shown in FIG. 1 operates in an uplink period UP. FIG. 10 is a diagram illustrating an example in which the display device shown in FIG. 1 operates in a first touch sensing period TSP1.

Referring to FIGS. 1, 4, and 8, a first frame period FR1 of the first mode may include an uplink period UP and a first touch sensing period TSP1. A second frame period FR2 subsequent to the first frame FR1 of the first mode may include a processing period PP in which a touch sensing value is processed.

Referring to FIGS. 8 and 9, the touch panel driver 130 may detect a second touch of a second object OBJ2 in the uplink period UP. In an embodiment, the touch panel driver 130 detects the second touch using a method different from the above-described mutual capacitance method in the uplink period UP, and detects a first touch which will be described later in the first touch sensing period TSP1.

The second object OBJ2 may be a device which assists a touch. For example, the second object OBJ2 may be an electronic pen. A user may touch the touch panel 110 by using the second object OBJ2. The second object OBJ2 may output an output signal to a portion in contact with the touch panel 110.

The touch panel driver 130 may receive an uplink sensing signal US corresponding to the output signal output by the second object OBJ2 from at least one of the first touch electrodes TX1 to TX48 and the second touch electrodes RX1 to RX28, and detect the second touch of the second object OBJ2, based on the uplink sensing signal US.

For example, the first touch electrodes TX1 to TX48 and the second touch electrodes RX1 to RX28 may receive the output signal, and the uplink sensing signal US corresponding to the output signal may be generated in the first touch electrodes TX1 to TX48 and the second touch electrodes RX1 to RX28. The touch panel driver 130 may detect whether the second touch has been input and/or a coordinate of the second touch (i.e., detection of the second touch) by processing the uplink sensing signal US.

The processing of the uplink sensing signal US may be a process of calculating whether the second touch has been input and/or a coordinate of the second touch from the uplink sensing signal US. The processing of the uplink sensing signal US may be performed in the processing period PP.

In this embodiment, it has been exemplified that the uplink sensing signal US is received from the first touch electrodes TX1 to TX48 and the second touch electrodes RX1 to RX28. However, the present disclosure is not limited thereto. For example, the touch panel driver 130 may receive the uplink sensing signal US from only the first touch electrodes TX1 to TX48 or from only the second touch electrodes RX1 to RX28, and detect the second touch.

Referring to FIGS. 8 and 10, in an embodiment, the touch panel driver 130 provides touch driving signals TDS to the first touch electrodes TX1 to TX48, receives touch sensing signals TSS corresponding to the touch driving signals TDS from the second touch electrodes RX1 to RX28, generates a touch sensing value based on at least two of the touch sensing signals TDS, and detects a first touch of a first object OBJ1 based on the touch sensing value. The first touch may be an initial touch.

The first object OBJ1 may be a conductor. For example, the first object OBJ1 may be a finger of a person. A user may touch the touch panel 110 by using the first object OBJ1. A change in capacitance between first and second touch electrodes TX and RX may be generated at a portion in contact with the touch panel 110 due to the first object OBJ1.

The touch panel driver 130 may receive the touch sensing signals TSS, and detect the first touch of the first object OBJ1, based on the touch sensing signals TSS.

For example, the touch panel driver 130 may generate a touch sensing value based on the touch sensing signals TSS. Also, the touch panel driver 130 may detect whether the first touch has been input and/or a coordinate of the first touch (i.e., detection of the first touch) by processing the touch sensing value.

The processing of the touch sensing value may be a process of calculating whether the first touch has been input and/or a coordinate of the first touch from the touch sensing value. The processing of the touch sensing value may be performed in the processing period PP. However, the generation of the touch sensing value may be performed in any one of the first touch sensing period TSP1 and the processing period PP.

The generation of the touch sensing value will be described in detail later.

The first mode may be a touch detection mode. A second mode which will be described later may be a touch active mode. For example, when the first touch is not input to the touch panel 110, the touch panel driver 130 may operate in the first mode. When the first touch is input to the touch panel 110, the touch panel driver 130 may operate in the second mode which will be described later.

In an embodiment, the touch panel driver 130 provides the touch driving signals TDS to all the first touch electrodes TX1 to TX48 in the first mode to detect whether a first or an initial touch has been input. Accordingly, the length of the first touch sensing period TSP1 may be lengthened, and the processing period PP may be included in another frame period different from the frame period including the uplink period UP and the first touch sensing period TSP1.

Figure 11:
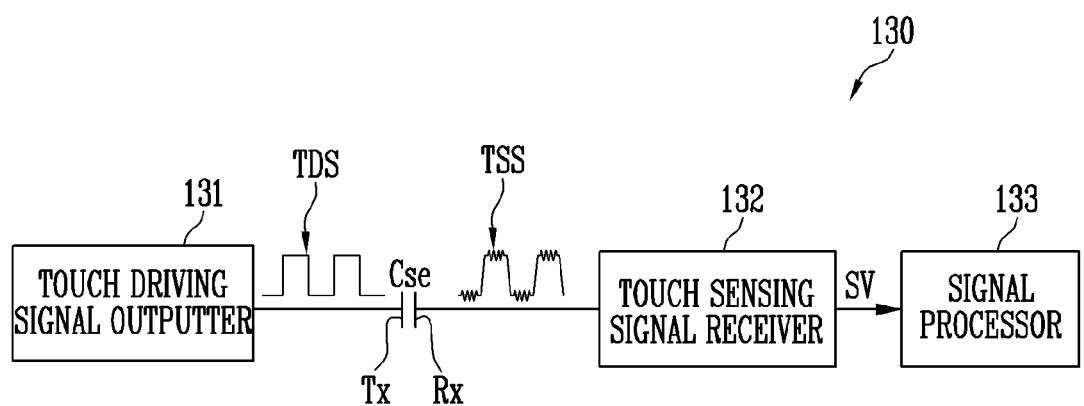
FIG. 11 is a diagram illustrating an example of a portion of a touch panel driver shown in FIG. 1.
Figure 12:
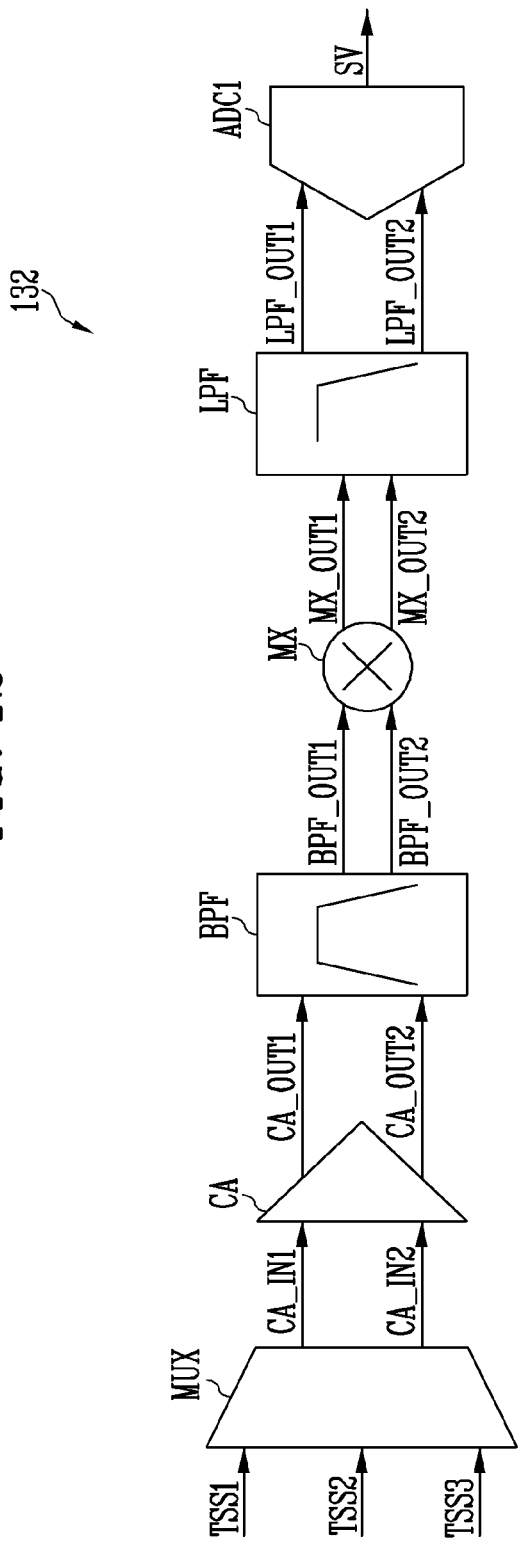
FIG. 12 is a diagram illustrating an example of a touch sensing signal receiver shown in FIG. 11.

FIG. 11 is a diagram illustrating an example of a portion of the touch panel driver 130 shown in FIG. 1. FIG. 12 is a diagram illustrating an example of a touch sensing signal receiver 132 shown in FIG. 11.

In FIG. 11, for convenience of description, components of the touch panel driver 130 except a touch driving signal outputter 131, the touch sensing signal receiver 132, and a signal processor 133 will be omitted.

Referring to FIG. 11, the touch panel driver 130 may include the touch driving signal outputter 131 (e.g., a signal generator), the touch sensing signal receiver 132, and the signal processor 133.

The touch driving signal outputter 131 may generate a touch driving signal TDS. In an embodiment, the touch driving signal TDS is a square wave. However, the present disclosure is not limited thereto. For example, in another embodiment, the touch driving signal TDS is a sinusoidal wave. The touch driving signal TDS may be input to a first touch electrode Tx.

A capacitor Cse may be formed by the first touch electrode Tx and a second touch electrode Rx. A touch sensing signal TSS corresponding to the touch driving signal TDS may be output to the second touch electrode Rx by the touch driving signal TDS supplied to the first touch electrode Tx. The touch sensing signal TSS may be input to the touch sensing signal receiver 132. The touch sensing signal receiver 132 may generate a touch sensing value SV based on the touch sensing signal TSS input from the second touch electrode Rx.

The signal processor 133 may process the touch sensing value SV, and detect whether a first touch has been input and/or a coordinate of the first touch, based on a result obtained by processing the touch sensing value SV. For example, the signal processor 133 may detect whether the first touch has been input and/or the coordinate of the first touch by synthetically analyzing a signal (i.e., the touch sensing value SV) input via the second touch electrodes RX1 to RX28 and the touch sensing signal receiver 132 from the first touch electrodes TX1 to TX48. For example, the signal processor 133 may be implemented as a microprocessor unit (MPU). A memory used for driving of the signal processor 133 may be additionally provided inside the signal processor 133. However, the configuration of the signal processor 133 is not limited thereto. For example, the signal processor 133 may be implemented as a microcontroller unit (MCU).

Referring to FIGS. 10 to 12, the touch panel driver 130 may include a plurality of touch sensing signal receivers 132. Each of the touch sensing signal receivers 132 may include a multiplexer MUX, a differential amplifier CA, a band pass filter BPF, a mixer MX, a low pass filter LPF, and a first analog-digital converter ADC1.

The multiplexer MUX may receive a first touch sensing signal TSS1, a second touch sensing signal TSS2, and a third touch sensing signal TSS3. That is the multiplexer MUX may be connected to three electrodes among the second touch electrodes RX1 to RX28.

The multiplexer MUX may select two signals among the first to third touch sensing signals TSS1, TSS2, and TSS3 and output the selected two signals. The two signals may be provided as input signals CA_IN1 and CA_IN2 to the differential amplifier CA. For example, the multiplexer MUX may be implemented as a multiplexer having an input/output ratio of 3:2.

For example, the multiplexer MUX may output, to the differential amplifier CA, the first touch sensing signal TSS1 and the second touch sensing signal TSS2 as the input signals CA_IN1 and CA_IN2. After that, the multiplexer MUX may output, to the differential amplifier CA, the second touch sensing signal TSS2 and the third touch sensing signal TSS3 as the input signals CA_IN1 and CA_IN2.

In an embodiment, the input touch sensing signal TSS may be duplicated between multiplexers MUX. For example, a plurality of multiplexers MUX may be connected to one of the second touch electrodes RX1 to RX28.

In this embodiment, it has been exemplified that the multiplexer MUX receives the first to third touch sensing signals TSS1, TSS2, and TSS3. However, the present disclosure is not limited to the order and number of touch sensing signals TSS received by the multiplexer MUX.

The differential amplifier CA may differentially amplify a first input signal CA_IN1 and a second input signal CA_IN2, thereby outputting complementary first and second differential signals CA_OUT1 and CA_OUT2. For example, the differential amplifier CA may be a fully differential amplifier.

A difference between touch sensing signals (i.e., the first input signal CA_IN1 and the second input signal CA_IN2) selected by the differential amplifier CA may become large. Accordingly, the magnitude of a touch sensing value SV which will be described later can be maximized.

The band pass filter BPF may select only a signal in a specific frequency band of each of the first differential signal CA_OUT1 and the second differential signal CA_OUT2, thereby outputting a first filtered signal BPF_OUT1 and a second filtered signal BPF_OUT2. For example, the specific frequency band may be a frequency band of the touch driving signal TDS. For example, the band pass filter BPF may amplify only a signal corresponding to the frequency band of the touch driving signal TDS.

The mixer MX may change a frequency of each of the first filtered signal BPF_OUT1 and the second filtered signal BPF_OUT2, thereby outputting a first demodulation signal MX_OUT1 and a second demodulation signal MX_OUT2. For example, the mixer MX may output the first demodulation signal MX_OUT1 by demodulating the first filtered signal BPF_OUT1, and output the second demodulation signal MX_OUT2 by demodulating the second filtered signal BPF_OUT2.

For example, the mixer MX may be implemented as a chopper. For example, the mixer MX may convert a signal in a relatively high frequency band into a demodulation signal in a low frequency band. Also, the mixer MV may convert noise in a relatively low frequency band into a noise signal in a high frequency band.

The low pass filter LPF may filter noise distributed in a high frequency band of each of the first demodulation signal MX_OUT1 and the second demodulation signal MX_OUT2, thereby outputting a first output signal LPF_OUT1 and a second output signal LPF_OUT2. For example, the low pass filter LPF may amplify only a signal in a relative low frequency band.

The first analog-digital converter ADC1 may receive the first output signal LPF_OUT1 and the second output signal LPF_OUT2, and generate a touch sensing value SV corresponding to a difference between the first output signal LPF_OUT1 and the second output signal LPF_OUT2.

Thus, the touch panel driver 130 generates a touch sensing value SV corresponding to a difference between two signals, so that the influence of noise generated in touch sensing signals TSS can be reduced as compared with when the touch sensing value SV is generated from one signal. Accordingly, the accuracy of touch detection can also be increased.

In addition, one touch sensing signal receiver 132 receives a plurality of touch sensing signals TSS, so that the number of touch sensing signal receivers 132 required can be decreased, and the size of the touch panel driver 130 can be reduced.

FIGS. 13 to 18 are views illustrating an example in which the display device 100 shown in FIG. 1 operates in the first touch sensing period TSP1 of the first mode.

In FIGS. 13 to 18, the first touch electrodes TX1 to TX48 to which the touch driving signal TDS is input are displayed by a gray color.

Referring to FIGS. 10, 12, and 13 to 18, the touch area TA may be a first row area RTA1, a second row area RTA2, and a third row area RTA3. The first to third row areas RTA1, RTA2, and RTA3 may be areas in which the first touch electrodes TX1 to TX48 are divided. However, the present disclosure is not limited to the number of row areas.

The touch panel driver 130 may provide touch driving signals TDS to a first portion (e.g., odd-numbered electrodes) of the first touch electrodes TX1 to TX48 in a first period TSP1_P1 of the first touch sensing period TSP1, and provide touch driving signals TDS to a second portion (e.g., even-numbered electrodes) different from the first portion of the first touch electrodes TX1 to TX48 in a second period TSP1_P2 of the first touch sensing period TSP1.

In an embodiment, in the first period TSP1_P1 of the first touch sensing period TSP1, the touch panel driver 130 sequentially provides touch driving signals TDS to a first portion of first touch electrodes TX1 to TX16 disposed in the first row area RTA1, a first portion of first touch electrodes TX17 to TX32 disposed in the second row area RTA2 different from the first row area RTA1, and a first portion of first touch electrodes TX33 to TX48 disposed in the third row area RTA3 different from the first row area RTA1 and the second row area RTA2. In an embodiment, in the second period TSP1_P2 of the first touch sensing period TSP1, the touch panel driver 130 sequentially provides touch driving signals TDS to a second portion of the first touch electrodes TX1 to TX16 disposed in the first row area RTA1, a second portion of the first touch electrodes TX17 to TX32 disposed in the second row area RTA2, and a second portion of the first touch electrodes TX33 to TX48 disposed in the third row area RTA3.

Figure 13:
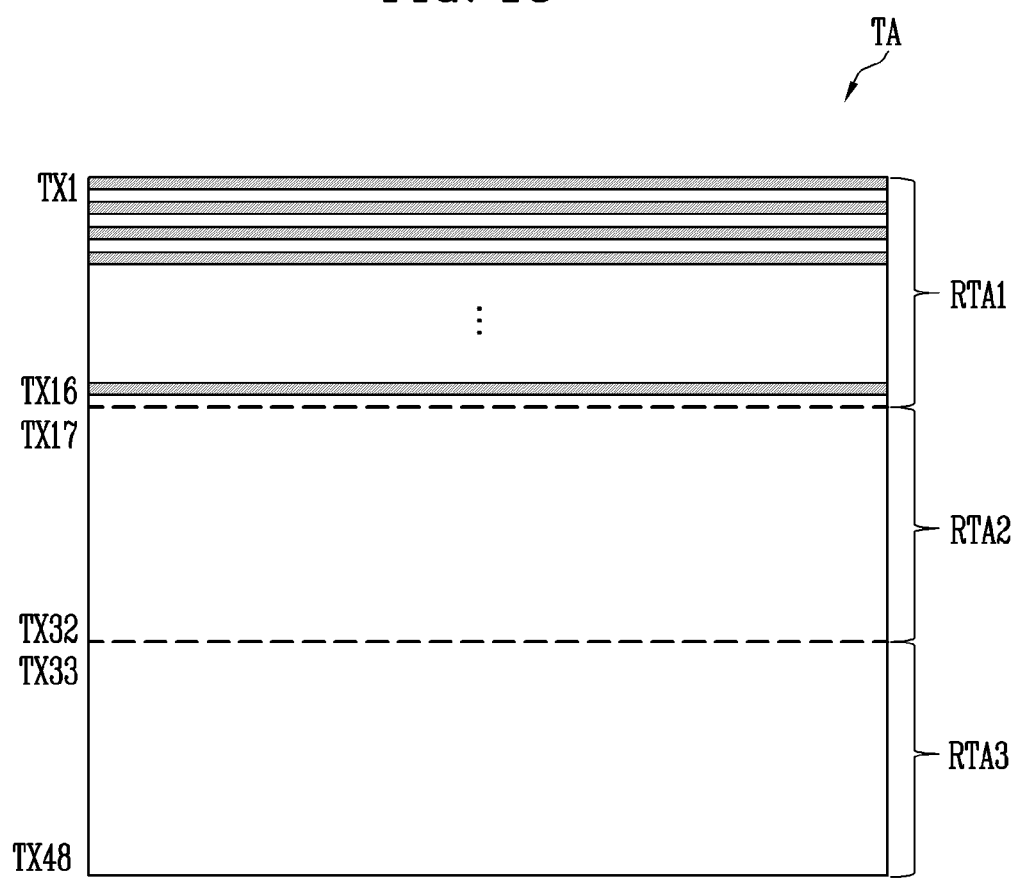
FIGS. 13 to 18 are views illustrating an example in which the display device shown in FIG. 1 operates in the first touch sensing period of the first mode.
Figure 14:
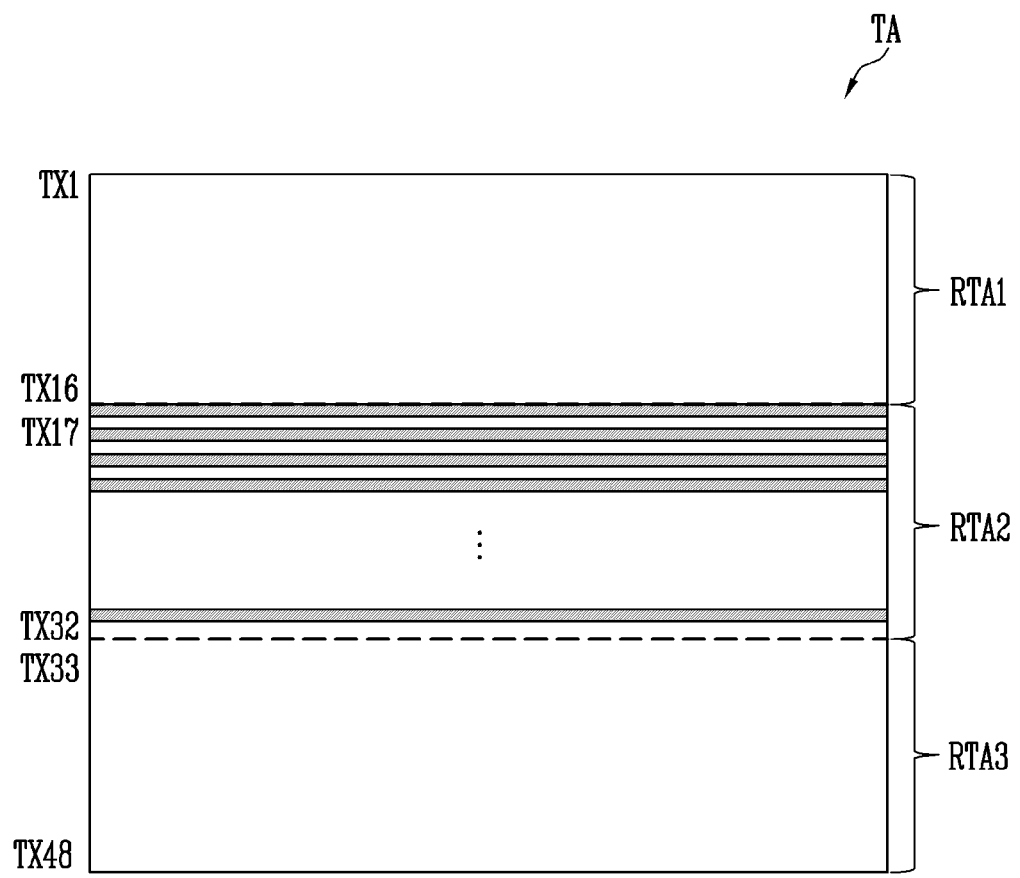
Figure 15:
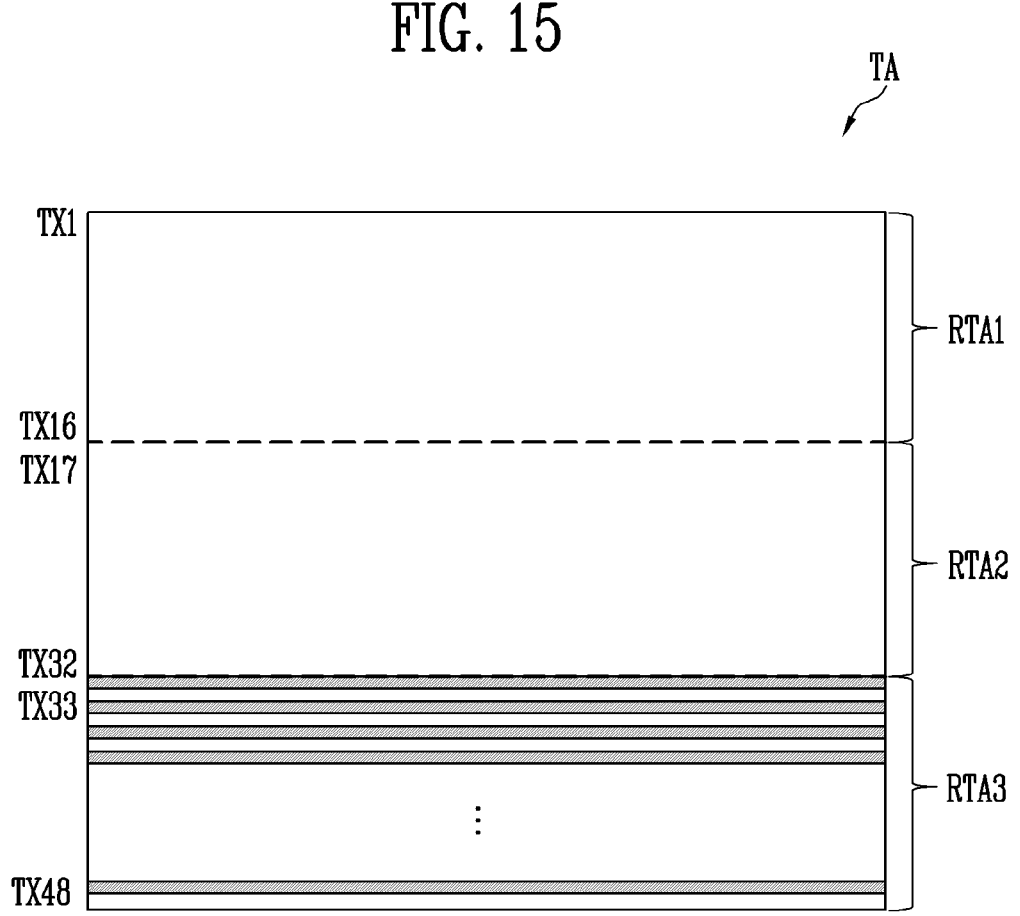

For example, as shown in FIG. 13, the touch panel driver 130 may provide touch driving signals TDS to odd-numbered electrodes among the first touch electrodes TX1 to TX16 of the first row area RTA1 (e.g., TX1, TX3, TX5, TX7, TX9, TX11, TX13, TX15) in the first period TSP1_P1 of the first touch sensing period TSP1. For example, as shown in FIG. 14, the touch panel driver 130 may provide touch driving signals TDS to odd-numbered electrodes among the first touch electrodes TX17 to TX32 of the second row area RTA2 (e.g., TX17, TX19, TX21, TX23, TX25, TX27, TX29, TX31) in the first period TSP1_P1 of the first touch sensing period TSP1. For example, as shown in FIG. 15, the touch panel driver 130 may provide touch driving signals TDS to odd-numbered electrodes among the first touch electrodes TX33 to TX48 of the third row area RTA3 (e.g., TX33, TX35, TX37, TX39, TX41, TX43, TX45, and TX47) in the first period TSP1_P1 of the first touch sensing period TSP1.

In an embodiment, the touch panel driver 130 provides the touch driving signals TDS to the odd-numbered electrodes among the first touch electrodes TX1 to TX16 of the first row area RTA1 during a first sub-period of the first period TSP1_P1, provides the touch driving signals TDS to the odd-numbered electrodes among the first touch electrodes TX17 to TX32 of the first row area RTA1 during a second sub-period of the first period TSP1_P1 after the first sub-period and provides touch driving signals TDS to the odd-numbered electrodes among the first touch electrodes TX33 to TX48 of the first row area RTA1 during a third sub-period of the first period TSP1_P1 after the second sub-period.

Figure 16:
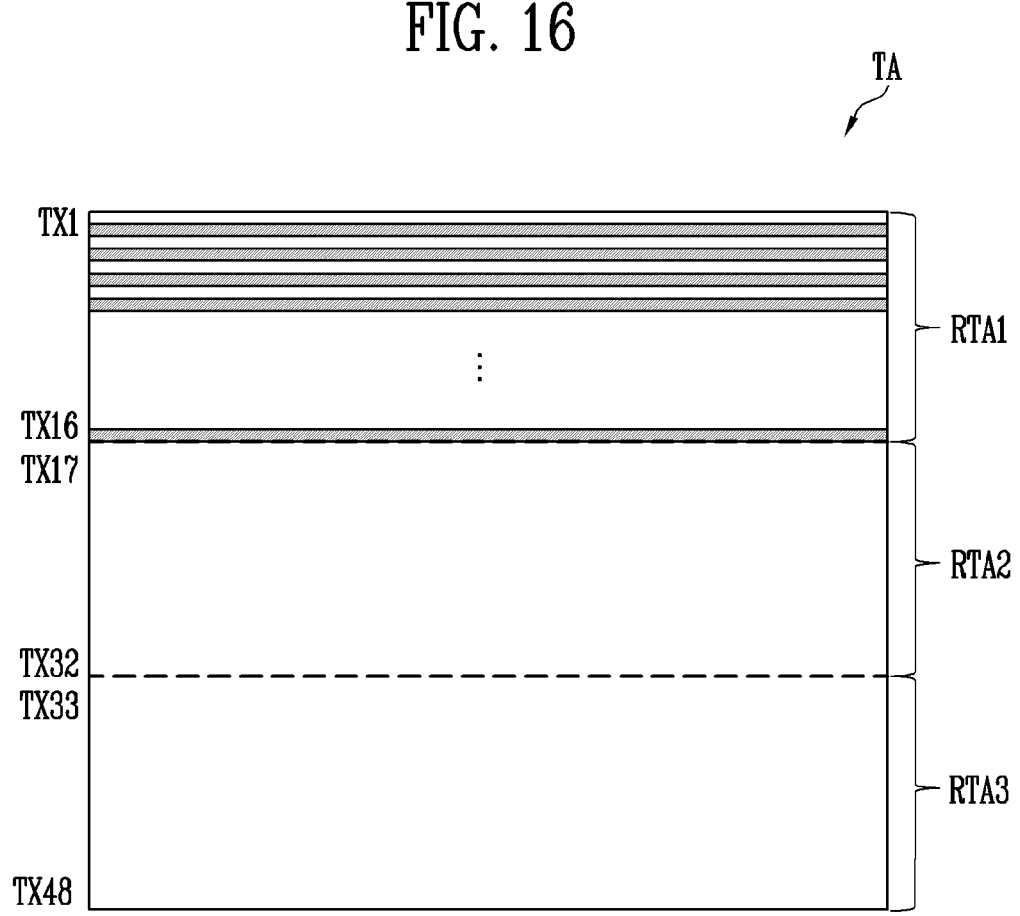
Figure 17:
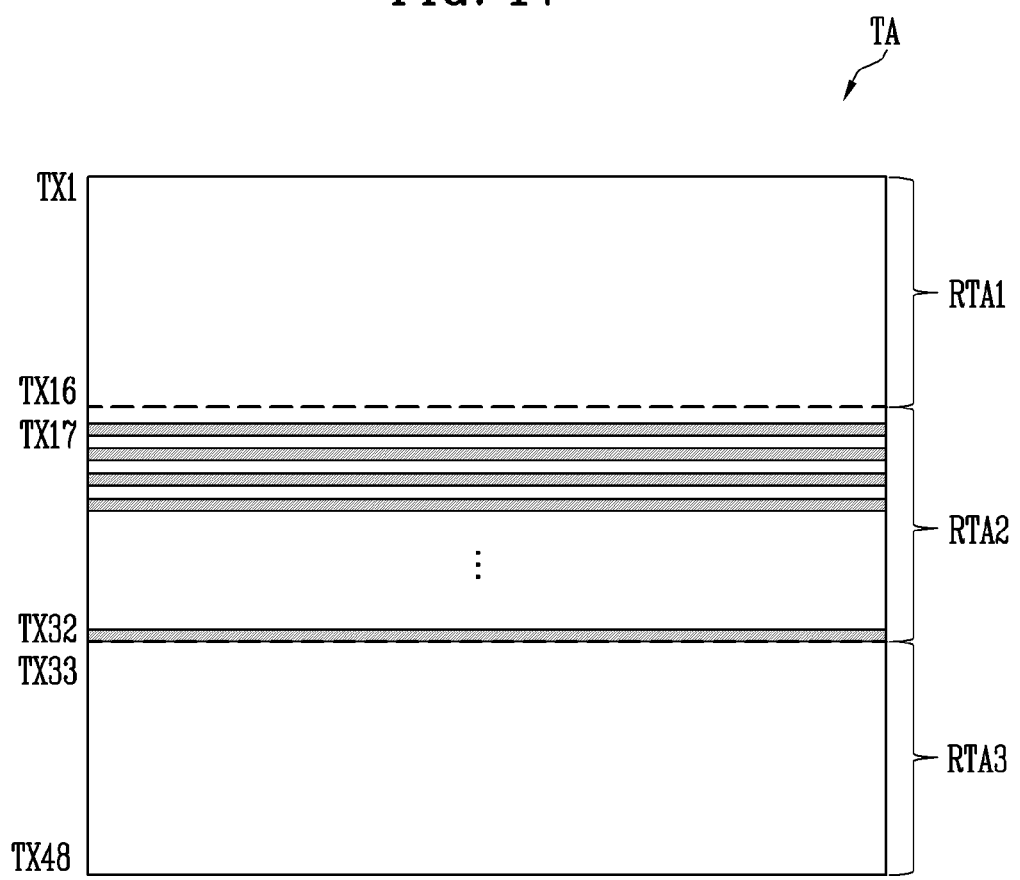
Figure 18:
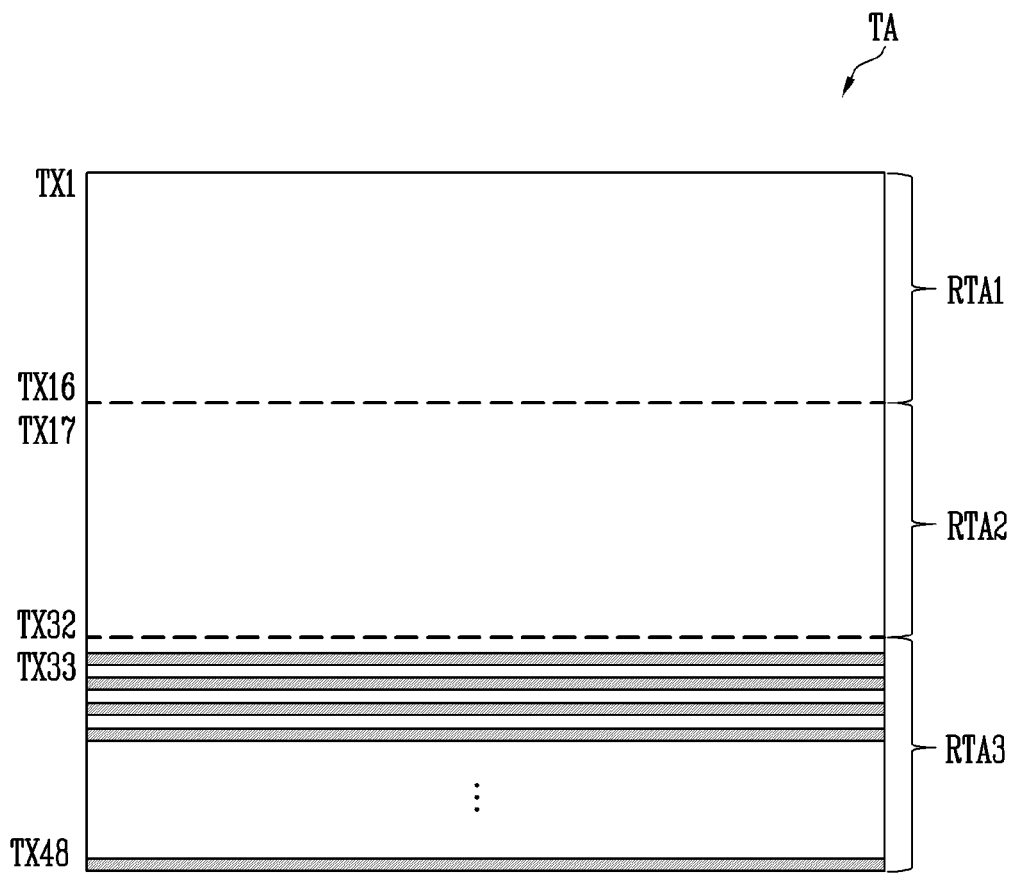

For example, as shown in FIG. 16, the touch panel driver 130 may provide touch driving signals TDS to even-numbered electrodes among the first touch electrodes TX1 to TX16 of the first row area RTA1 (e.g., TX2, TX4, TX6, TX8, TX10, TX12, TX14, TX16) in the second period TSP1_P2 of the first touch sensing period TSP1. For example, as shown in FIG. 17, the touch panel driver 130 may provide touch driving signals TDS to even-numbered electrodes among the first touch electrodes TX17 to TX32 of the second row area RTA2 (e.g., TX18, TX20, TX22, TX24, TX26, TX28, TX30, TX32) in the second period TSP1_P2 of the first touch sensing period TSP1. For example, as shown in FIG. 18, the touch panel driver 130 may provide touch driving signals TDS to even-numbered electrodes among the first touch electrodes TX33 to TX48 of the third row area RTA3 (e.g., TX34, TX36, TX38, TX40, TX42, TX44, TX46, TX48) in the second period TSP1_P2 of the first touch sensing period TSP1.

In an embodiment, the touch panel driver 130 provides the touch driving signals TDS to the even-numbered electrodes among the first touch electrodes TX1 to TX16 of the first row area RTA1 during a first sub-period of the second period TSP1_P2, provides touch driving signals TDS to the even-numbered electrodes among the first touch electrodes TX17 to TX32 of the first row area RTA1 during a second sub-period of the second period TSP1_P2 after the first sub-period and provides touch driving signals TDS to the even-numbered electrodes among the first touch electrodes TX33 to TX48 of the first row area RTA1 during a third sub-period of the second period TSP1_P2 after the second sub-period.

Thus, the touch panel 110 is time-divisionally driven, so that the number of touch sensing signal receivers (132 shown in FIG. 13) required can be decreased, and the size of the touch panel driver 130 can be decreased.

In this embodiment, it has been exemplified that the first portion is an odd-numbered electrode and the second portion is an even-numbered electrode. However, the present disclosure is not limited to the method of selecting the first portion and the second portion. For example, the first portion of a given row area could be a subset of the first touch electrodes of the given row area and the second portion would be the first touch electrodes outside the subset.

Figure 19:
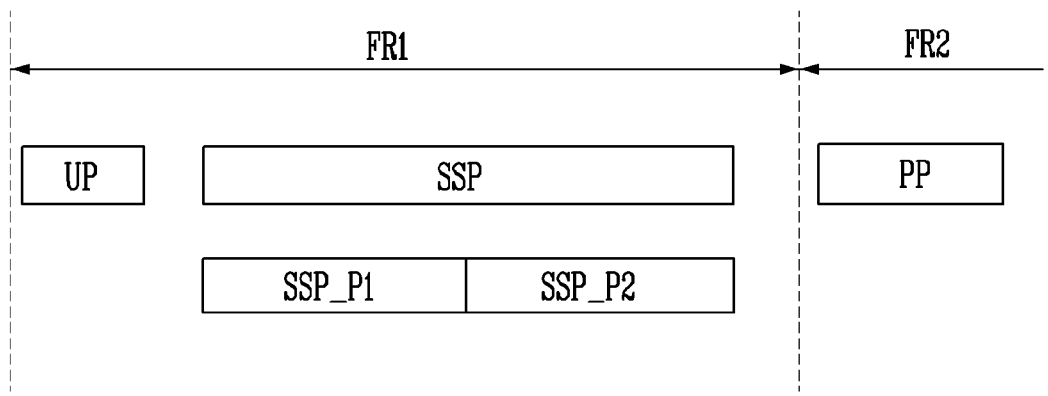
FIG. 19 is a diagram illustrating that a display device operates in the first mode in accordance with an embodiment of the present disclosure.
Figure 20:
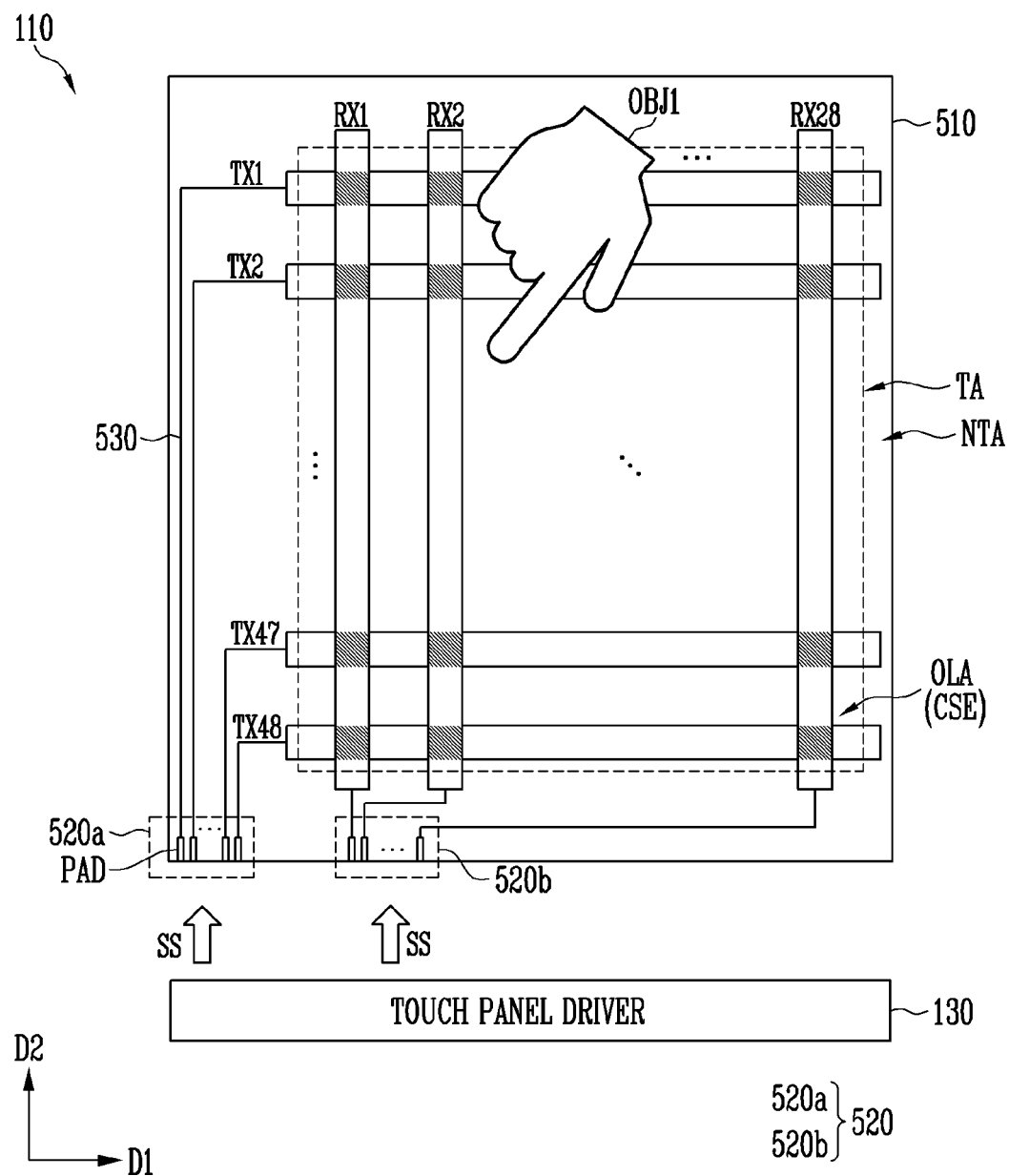
FIG. 20 is a diagram illustrating an example in which the display device shown in FIG. 19 operates in a self-sensing period.

FIG. 19 is a diagram illustrating that a display device operates in the first mode in accordance with an embodiment of the present disclosure. FIG. 20 is a diagram illustrating an example in which the display device shown in FIG. 19 operates in a self-sensing period SSP.

The display device in accordance with this embodiment is configured substantially identically to the display device 100 shown in FIG. 1, except that the display device includes the self-sensing period SSP instead of the first touch sensing period TSP1. Therefore, components identical or similar to those described above are designated by like reference numerals, and overlapping descriptions will be omitted.

Referring to FIGS. 19 and 20, the touch panel driver 130 may provide self-sensing signals SS to the first touch electrodes TX1 to TX48 and the second touch electrodes RX1 to RX28, and detect a first touch of a first object OBJ1, based on a variation of the self-sensing signals SS (i.e., a variation of a self-capacitance for each of the touch electrodes TX1 to TX48 and RX1 to RX28). The touch panel driver 130 may provide the self-sensing signals SS to the first touch electrodes TX1 to TX48 and the second touch electrodes RX1 to RX28 of the touch area TA in the self-sensing period SSP of the first mode.

The touch panel 110 may be driven using a self-capacitance method. Each of the first touch electrodes TX1 to TX48 and the second touch electrodes RX1 to RX28 may form a self-capacitor. In the self-capacitance method, the touch panel driver 130 may provide self-sensing signals SS to the first touch electrodes TX1 to TX48 and the second touch electrodes RX1 to RX28, and the self-capacitor of each of the first touch electrodes TX1 to TX48 and the second touch electrodes RX1 to RX28 may be charged. After that, when the first object OBJ1 approaches toward the touch panel 110, a capacitance with respect to each of the first touch electrodes TX1 to TX48 and the second touch electrodes RX1 to RX28 may be changed. The touch panel driver 130 may detect whether the first touch has been input and/or a coordinate of the first touch, based on the changed capacitance.

For example, the touch panel driver 130 may detect whether the first touch has been input and/or a coordinate of the first touch (i.e., detection of the first touch) by processing the variation of the self-sensing signals SS.

The processing of the variation of the self-sensing signals SS may be a process of calculating whether the first touch has been input and/or a coordinate of the first touch from the variation of the self-sensing signals SS. The processing of the variation of the self-sensing signals SS may be performed in the processing period PP.

In an embodiment, the touch panel driver 130 provides self-sensing signals SS to the first touch electrodes TX1 to TX48 in a first period SSP_P1 of the self-sensing period SSP, and provides self-sensing signals SS to the second touch electrode RX1 to RX28 in a second period SSP_P2 of the self-sensing period SSP. In an embodiment, the second period SSP_P2 occurs after the first period SSP_P1.

In an embodiment, the touch panel driver 130 sequentially provides self-sensing signals SS to the first touch electrodes TX1 to TX48 and the second touch electrodes RX1 to RX28. In an embodiment, the touch panel driver 130 divides the touch area TA into a plurality of areas, and sequentially provides self-sensing signals SS to the areas.

In this embodiment, it has been exemplified that the touch panel driver 130 provides self-sensing signals SS to the first touch electrodes TX1 to TX48 and the second touch electrodes RX1 to RX28. However, the present disclosure is not limited thereto. For example, the touch panel driver 130 may provide self-sensing signals SS to only the first touch electrodes TX1 to TX48 or to only the second touch electrodes RX1 to RX28.

Figure 21:
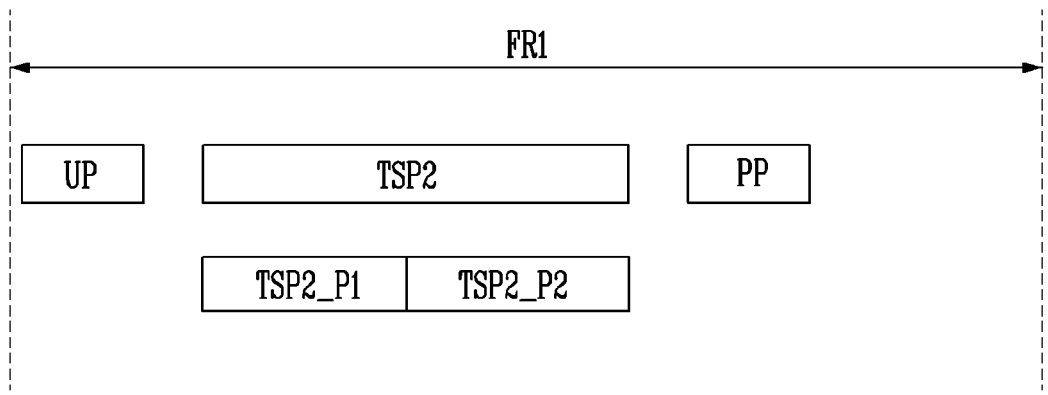
FIG. 21 is a diagram illustrating an example in which the display device shown in FIG. 1 operates in a second mode.
Figure 22:
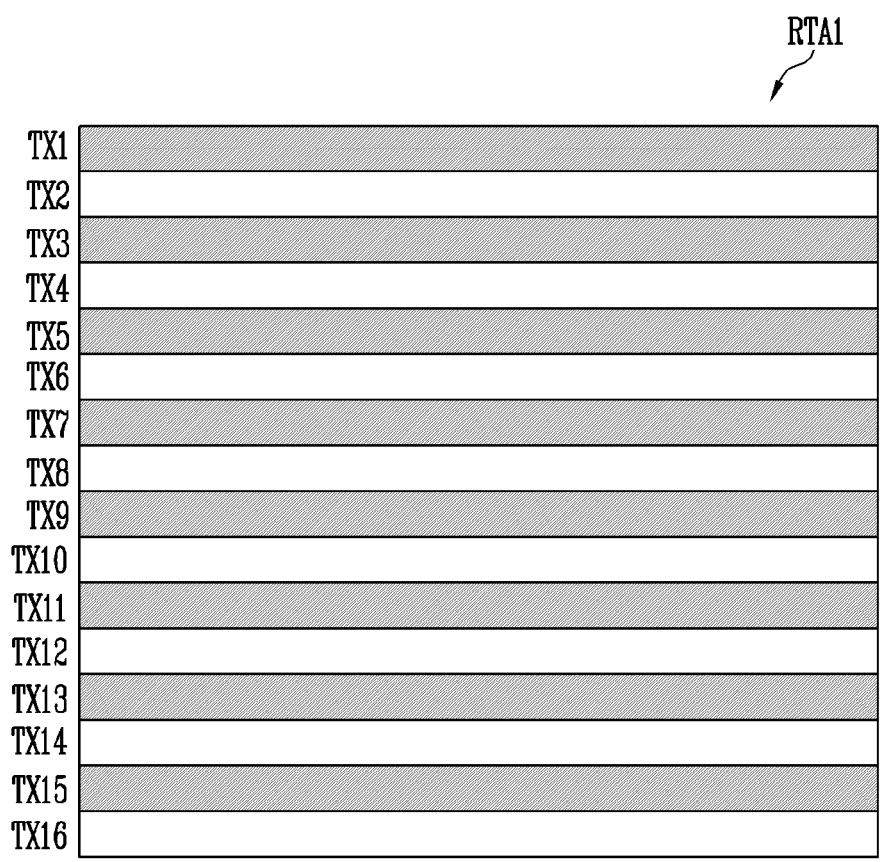
FIGS. 22 and 23 are views illustrating an example in which the display device shown in FIG. 1 operates in a second touch sensing period of the second mode.
Figure 23:
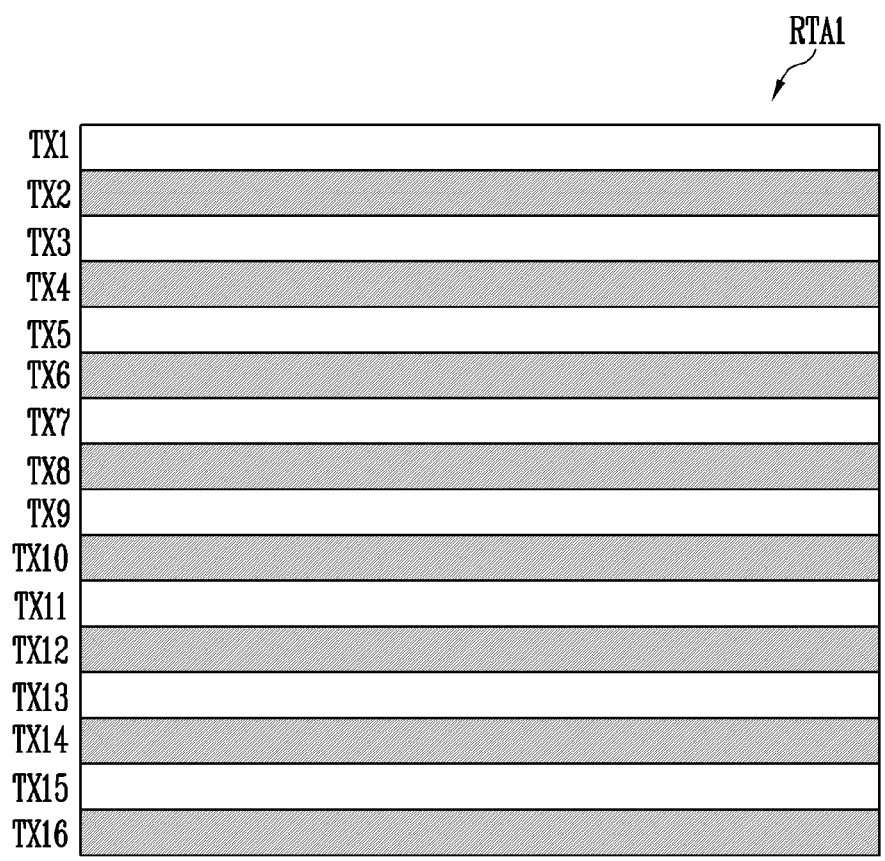

FIG. 21 is a diagram illustrating an example in which the display device 100 shown in FIG. 1 operates in the second mode. FIGS. 22 and 23 are views illustrating an example in which the display device 100 shown in FIG. 1 operates in a second touch sensing period TSP2 of the second mode.

FIGS. 22 and 23 illustrate a case where a first touch is detected in the first row area RTA1. In FIGS. 22 and 23, the first touch electrodes TX1 to TX16 to which the touch driving signal TDS is input are displayed by a gray color.

Referring to FIGS. 10 and 21 to 23, the touch panel driver 130 may operate in the second mode when the first touch is detected. The second mode may be the touch active mode. For example, when the first touch is input to the touch panel 110, the touch panel driver 130 may operate in the second mode.

The touch panel driver 130 provides touch driving signals TDS to the first touch electrodes TX1 to TX16 disposed in the first row area RTA1 in which the first touch is detected (i.e., an area in which the first touch is detected) in the second touch sensing period TSP2. Like the first touch sensing period (TSP1 shown in FIG. 8), the touch panel driver 130 may detect the first touch by using the mutual capacitance method in the second touch sensing period TSP2.

A first frame period FR1 of the second mode may include an uplink period UP, the second touch sensing period TSP2, and a processing period PP. The touch panel driver 130 may detect a first touch in the first mode and then operate in the second mode. The touch panel driver 130 may detect the first touch, based on the area in which the first touch is detected, so as to detect drawing by the first object OBJ1. Thus, the second touch sensing period TSP2 in which the first touch in a partial area is detected is shorter than the first touch sensing period (TSP1 shown in FIG. 8) in which the first touch in the entire area is detected, and the processing period PP is included in the same frame period of the uplink period UP and the second touch sensing period TSP2. As a result, a touch report rate becomes high, and a response speed to a touch can be increased.

The touch report rate may be a frequency at which a touch coordinate is generated. For example, when the touch report rate is 120 Hz, the touch panel driver 130 may generate 120 touch coordinates per second.

In an embodiment, the touch panel driver 130 may provide touch driving signals TDS to a first portion (e.g., an odd-numbered electrode) of the first touch electrodes TX1 to TX16 disposed in the first row area RTA1 in a first period TSP2_P1 of the second touch sensing period TSP2, and provide touch driving signals TDS to a second portion (e.g., an even-numbered electrode) different from the first portion of the first touch electrodes TX1 to TX16 disposed in the first row area RTA1 in a second period TSP2_P2 of the second touch sensing period TSP2.

For example, as shown in FIG. 22, the touch panel driver 130 may provide touch driving signals TDS to odd-numbered electrodes among the first touch electrodes TX1 to TX16 of the first row area RTA1 in the first period TSP2_P1 of the second touch sensing period TSP2. For example, as shown in FIG. 23, the touch panel driver 130 may provide touch driving signals TDS to even-numbered electrodes among the first touch electrodes TX1 to TX16 of the first row area RTA1 in the second period TSP2_P2 of the second touch sensing period TSP2.

In this embodiment, it has been exemplified that the first portion is an odd-numbered electrode and the second portion is an even-numbered electrode. However, the present disclosure is not limited to the method of selecting the first portion and the second portion.

FIGS. 24 to 27 are views illustrating that a display device operates in the second touch sensing period TSP2 of the second mode in accordance with an embodiment of the present disclosure.

FIGS. 24 to 27 illustrate a case where a first touch is detected in the first row area RTA1. In FIGS. 24 to 27, the first touch electrodes TX1 to TX16 to which the touch driving signal TDS is input are displayed by a gray color.

The display device in accordance with this embodiment is configured substantially identically to the display device 100 shown in FIG. 1, except an operation of the display device occurs in the second touch sensing period TSP2. Therefore, components identical or similar to those described above are designated by like reference numerals, and overlapping descriptions will be omitted.

Referring to FIGS. 10 and 24 to 27, the first row area RTA1 may be divided into a (1-1)th row area RTA1-1 and a (1-2)th row area RTA1-2. The (1-1)th row area RTA1-1 and the (1-2)th row area RTA1-2 may be areas in which the first electrodes TX1 to TX16 disposed in the first row area RTA1 are divided. However, the present disclosure is not limited to the number of row areas.

In an embodiment, the touch panel driver 130 sequentially provides touch driving signals TDS to a first portion (e.g., an odd-numbered electrode) of first touch electrodes TX1 to TX8 disposed in the (1-1)th row area RTA1-1 included in the first row area RTA1 and a first portion of first touch electrodes TX9 to TX16 disposed in the (1-2)th row area RTA1-2 different from the (1-1)th row area RTA1-1, which is included in the first row area RTA1, in the first period TSP2_P1 of the second touch sensing period TSP2, and sequentially provides touch driving signals TDS to a second portion (e.g., an even-numbered electrode) of the first touch electrodes TX1 to TX8 disposed in the (1-1)th row area RTA1-1 and a second portion of the first touch electrodes TX9 to TX16 disposed in the (1-2)th row area RTA1-2 in the second period TSP2_P2 of the second touch sensing period TSP2.

Figure 24:
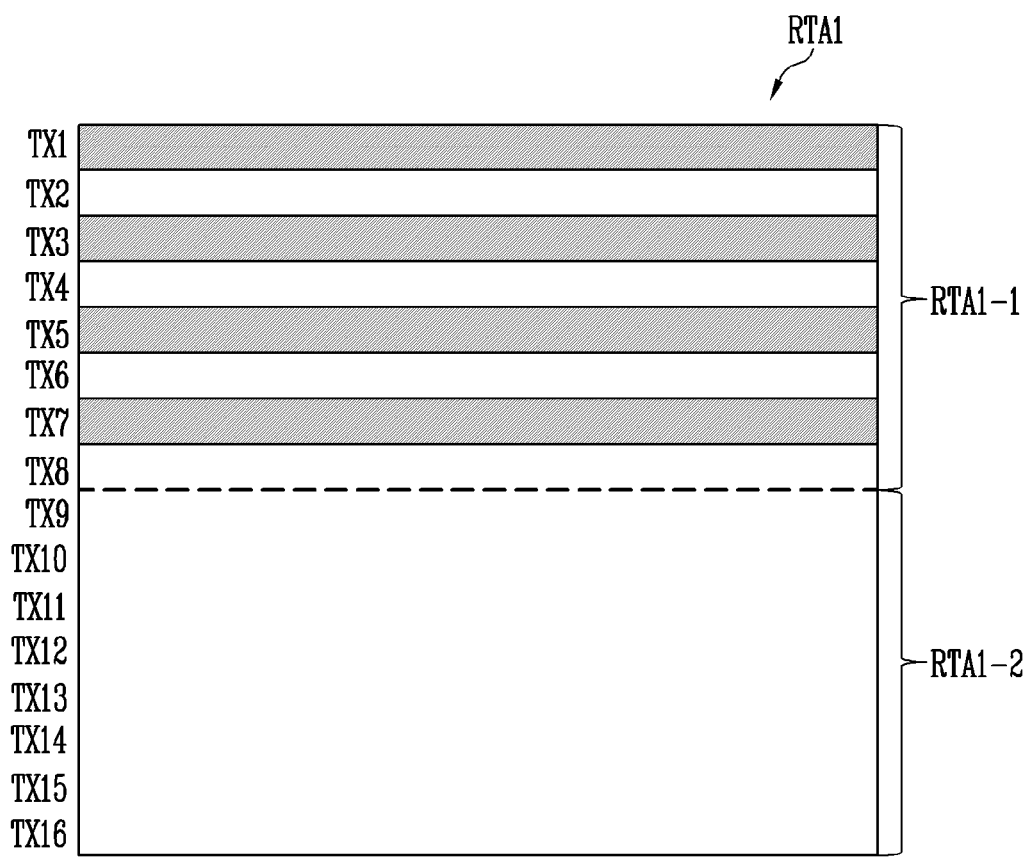
FIGS. 24 to 27 are views illustrating that a display device operates in the second touch sensing period of the second mode in accordance with an embodiment of the present disclosure.
Figure 25:
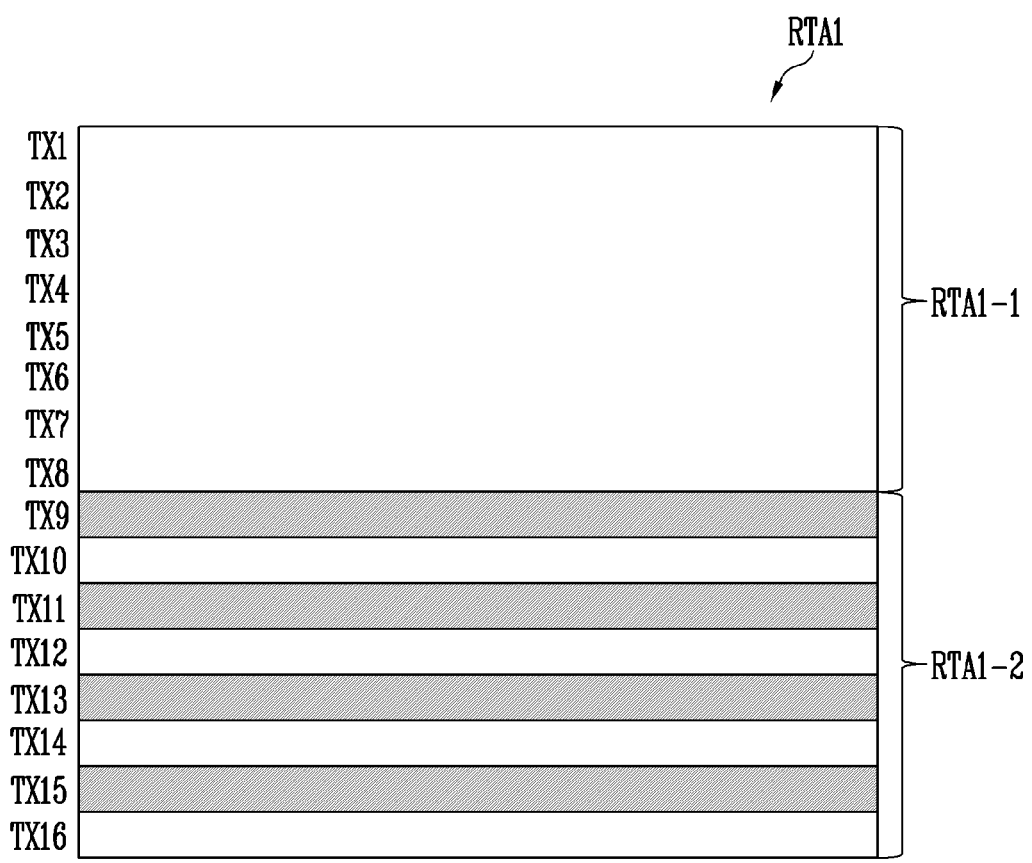

For example, as shown in FIG. 24, the touch panel driver 130 may provide touch driving signals TDS to odd-numbered electrodes among the first touch electrodes TX1 to TX8 of the (1-1)th row area RTA1-1 in the first period TSP2_P1 of the second touch sensing period TSP2. For example, as shown in FIG. 25, the touch panel driver 130 may provide touch driving signals TDS to odd-numbered electrodes among the first touch electrodes TX9 to TX16 of the (1-2)th row area RTA1-2 in the first period TSP2_P1 of the second touch sensing period TSP2.

Figure 26:
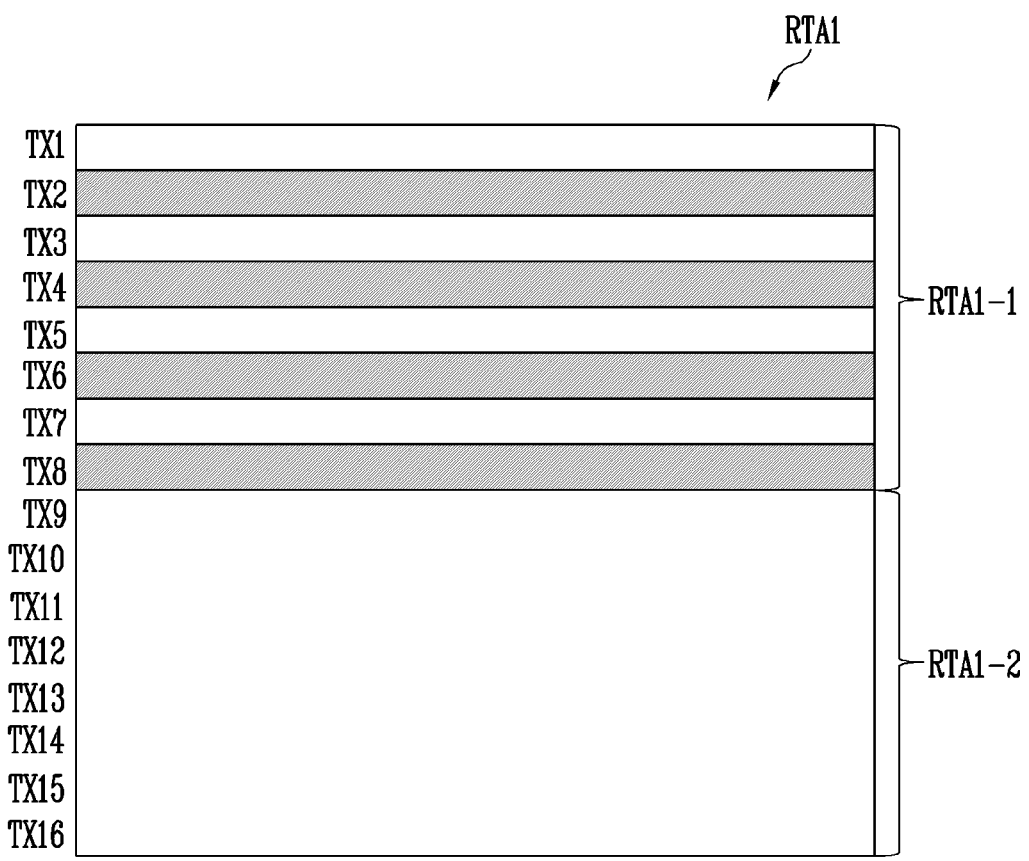
Figure 27:
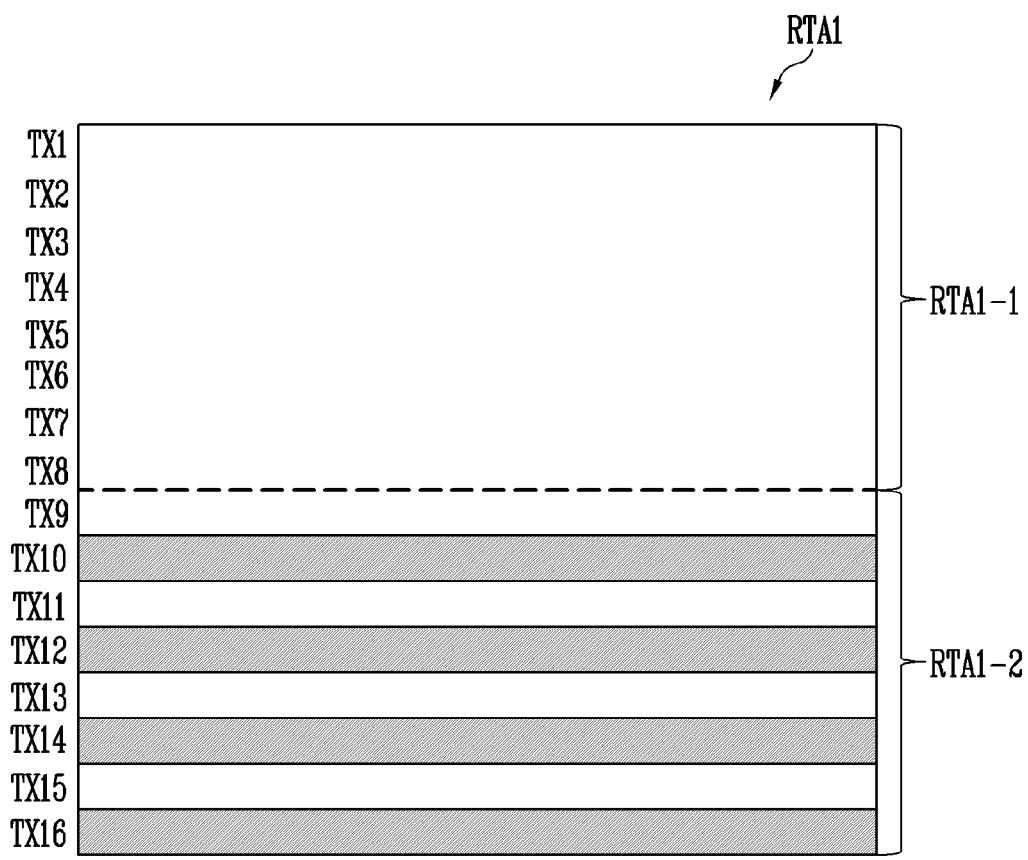

For example, as shown in FIG. 26, the touch panel driver 130 may provide touch driving signals TDS to even-numbered electrodes among the first touch electrodes TX1 to TX8 of the (1-1)th row area RTA1-1 in the second period TSP2_P2 of the second touch sensing period TSP2. For example, as shown in FIG. 27, the touch panel driver 130 may provide touch driving signals TDS to even-numbered electrodes among the first touch electrodes TX9 to TX16 of the (1-2)th row area RTA1-2 in the second period TSP2_P2 of the second touch sensing period TSP2.

The first mode may be used to detect an initial touch by an object to detect which sub-section of the touch panel 100 the initial touch has occurred within. All first touch electrodes of the touch panel 100 may be driven using the touch driving signals TDS in the first mode until this initial touch is detected using at least two of the touch sensing signals TSS received in response to the touch driving signals TDS. Then, the second mode may be used to drive only the detected sub-section of the touch panel 100. Thus, less than all of the first touch electrodes receive the touch driving signals TDS in the second mode. Accordingly, a smaller set of the touch sensing signals TSS may be received in the second mode to detect a subsequent touch by the object.

In this embodiment, it has been exemplified that the first portion is an odd-numbered electrode and the second portion is an even-numbered electrode. However, the present disclosure is not limited to the method of selecting the first portion and the second portion.

Referring to FIGS. 8, 10, 13 to 18, and 24 to 27, a number of first touch electrodes simultaneously receiving touch driving signals TDS in the second touch sensing period TSP2 may be smaller than a number of first touch electrodes simultaneously receiving touch driving signals TDS in the first touch sensing period (TSP1 shown in FIG. 8). For example, as shown in FIGS. 13 to 18, the touch panel driver 130 may simultaneously provide touch driving signals TDS to eight electrodes among the first touch electrodes TX1 to TX48 in the first touch sensing period TSP1, and simultaneously provide touch driving signals TDS to four electrodes among the first touch electrodes TX1 to TX16 in the second touch sensing period TSP2.

Figure 28:
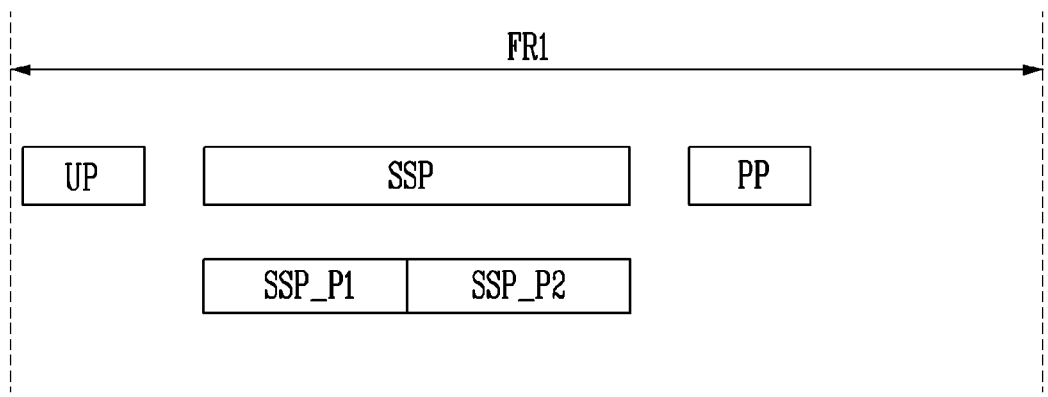
FIG. 28 is a diagram illustrating that a display device operates in the second mode in accordance with an embodiment of the present disclosure.
Figure 29:
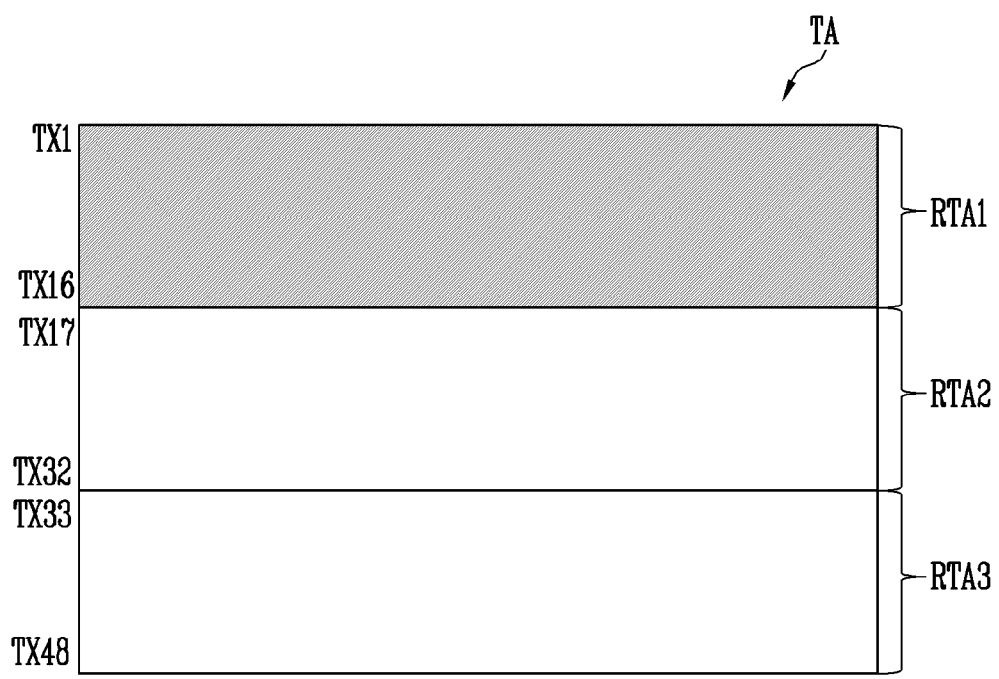
FIGS. 29 and 30 are views illustrating an example in which the display device shown in FIG. 28 operates in the self-sensing period of the second mode.
Figure 30:
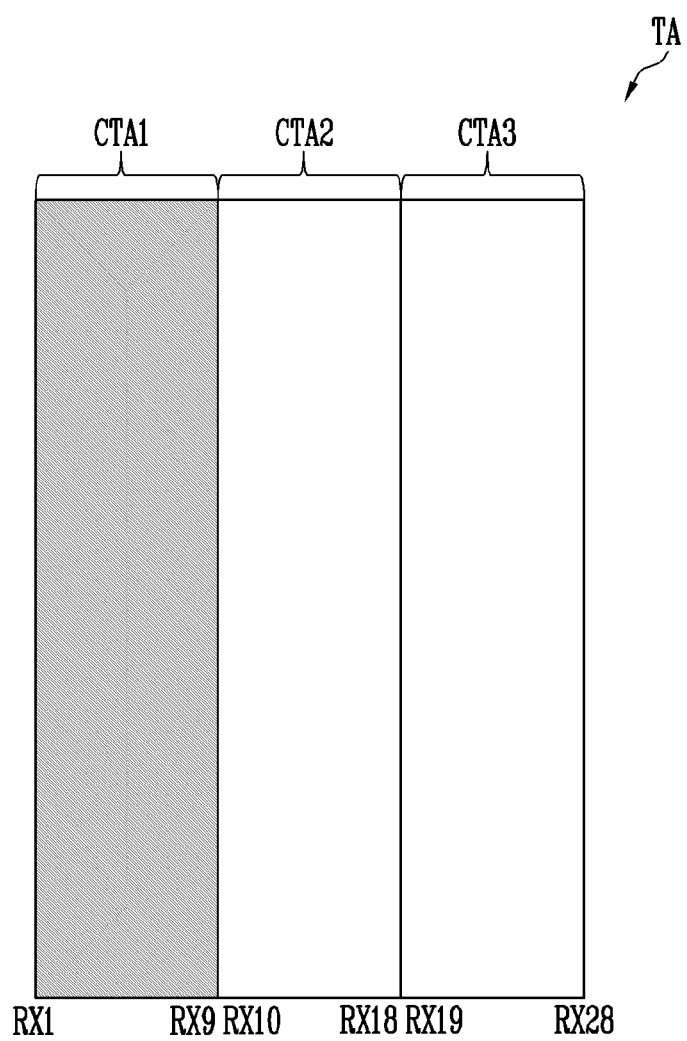

FIG. 28 is a diagram illustrating that a display device operates in the second mode in accordance with an embodiment of the present disclosure. FIGS. 29 and 30 are views illustrating an example in which the display device shown in FIG. 28 operates in the self-sensing period SSP of the second mode.

FIGS. 29 and 30 illustrate a case where a first touch is detected in an area in which the first row area RTA1 and a first column area CTA1 overlap with each other. In FIGS. 29 and 30, touch electrodes to which self-sensing signals SS are input are displayed by a gray color.

The display device in accordance with these embodiments is configured substantially identically to the display device 100 shown in FIG. 1, except that the display device includes the self-sensing period SSP instead of the second touch sensing period TSP2. Therefore, components identical or similar to those described above are designated by like reference numerals, and overlapping descriptions will be omitted.

Referring to FIGS. 20 and 28 to 30, the touch area TA may be divided into a first column area CTA1, a second column area CTA2, and a third column area CTA3. The first to third column areas CTA1, CTA2, and CTA3 may be areas in which the second touch electrodes RX1 to RX28 are divided. However, the present disclosure is not limited to the number of column areas.

The touch panel driver 130 may provide self-sensing signals SS to the first touch electrodes TX1 to TX16 disposed in the first row area RTA1 (i.e., an area in which the first touch is detected) and second touch electrodes RX1 to RX9 disposed in the first column area CTA1 (i.e., an area in which the first touch is detected), and detect the first touch of the first object OBJ1, based on a variation of the self-sensing signals SS. The touch panel driver 130 may provide self-sensing signals SS to the first touch electrodes TX1 to TX48 of the first row area RTA1 and the second touch electrodes RX1 to RX28 of the first column area CTA1 in the self-sensing period SS of the second mode.

In an embodiment, the touch panel driver 130 provides self-sensing signals SS to the first touch electrodes TX1 to TX48 disposed in the first row area RTA1 in the first period SSP_P1 of the self-sensing period SSP, and provides self-sensing signals SS to the second touch electrodes RX1 to RX28 disposed in the first column area CTA1 in the second period SSP_P2 of the self-sensing period SSP.

In this embodiment, it has been exemplified that the touch panel driver 130 provides self-sensing signals SS to the first touch electrodes TX1 to TX48 and the second touch electrodes RX1 to RX28. However, the present disclosure is not limited thereto. For example, the touch panel driver 130 may provide self-sensing signals SS to only the first touch electrodes TX1 to TX48 or to only the second touch electrodes RX1 to RX28.

Figure 31:
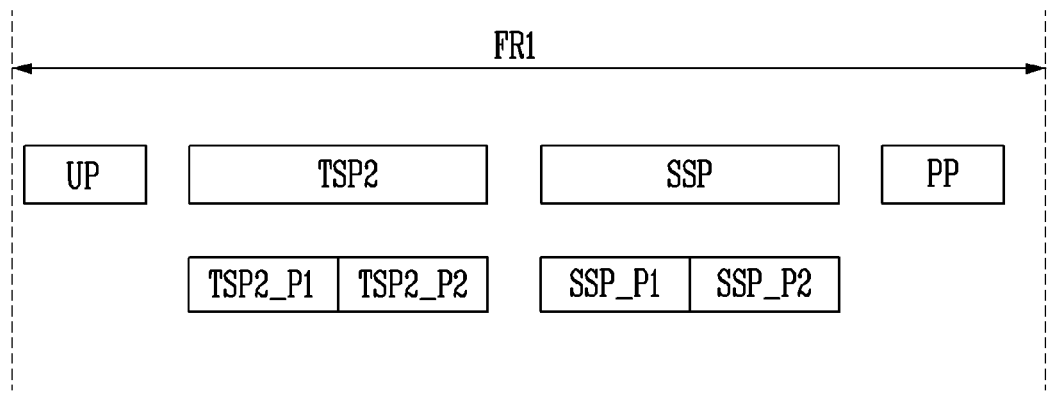
FIG. 31 is a diagram illustrating that a display device operates in the second mode in accordance with an embodiment of the present disclosure.

FIG. 31 is a diagram illustrating that a display device operates in the second mode in accordance with an embodiment of the present disclosure.

The display device in accordance with this embodiments is configured substantially identically to the display device 100 shown in FIG. 1, except that the display device includes a self-sensing period SSP in the second mode. Therefore, components identical or similar to those described above are designated by like reference numerals, and overlapping descriptions will be omitted.

Referring to FIG. 31, a first frame period FR1 of the second mode may include a second touch sensing period TSP2 and a self-sensing period SSP. Since the second mode includes the second touch sensing period TSP2 which is relatively short, the second mode may further include the self-sensing period SSP in one frame period. In addition, detection of the first touch in the self-sensing period SSP may complement detection of the first touch in the second touch sensing period TSP2. Accordingly, the accuracy of touch detection can be increased.

Figure 32:
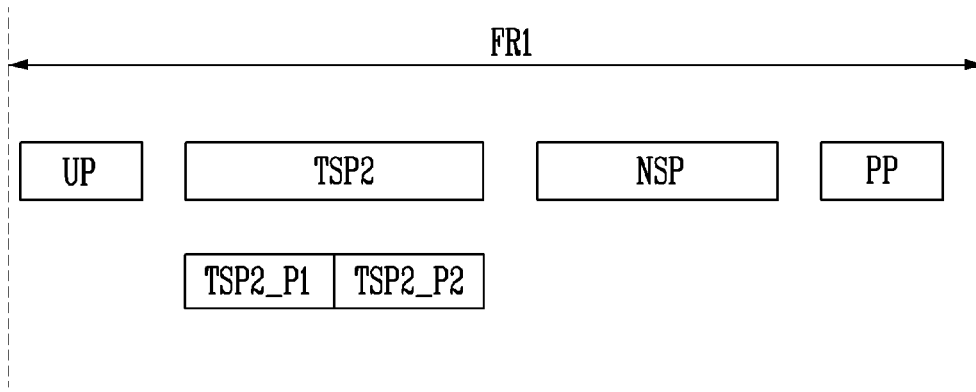
FIG. 32 is a diagram illustrating that a display device operates in the second mode in accordance with an embodiment of the present disclosure.
Figure 33:
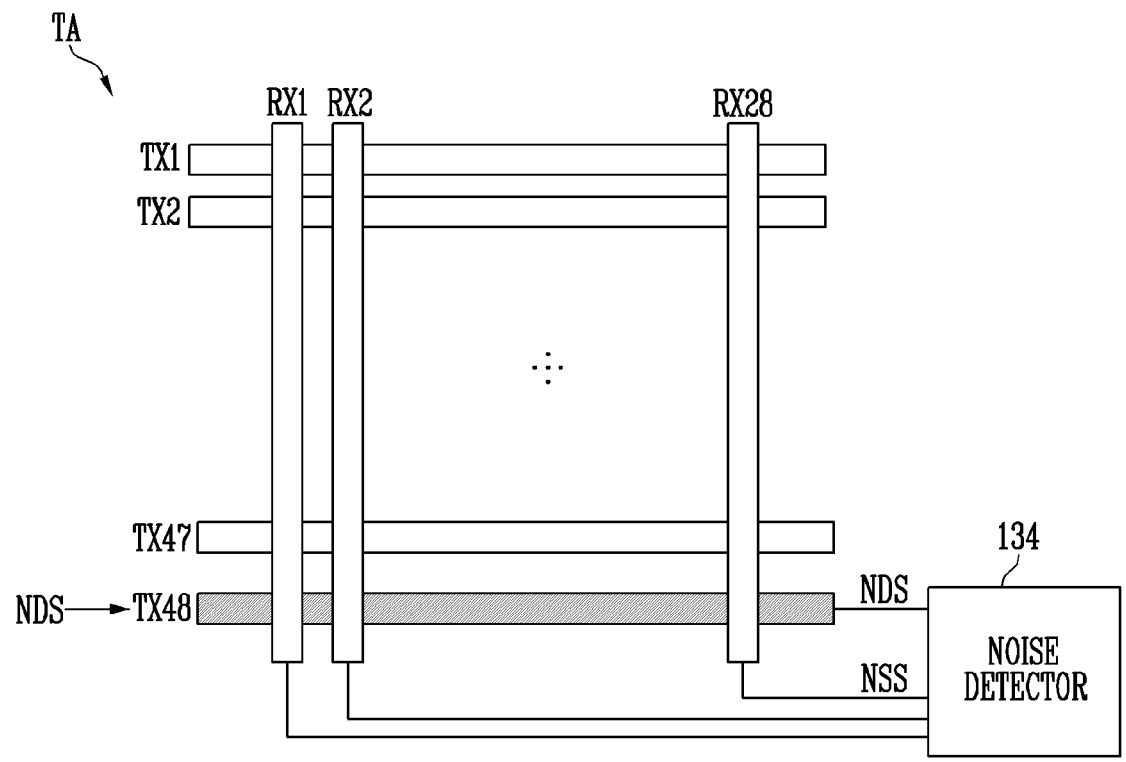
FIG. 33 is a diagram illustrating an example in which the display device shown in FIG. 32 operates in a noise sensing period.
Figure 34:
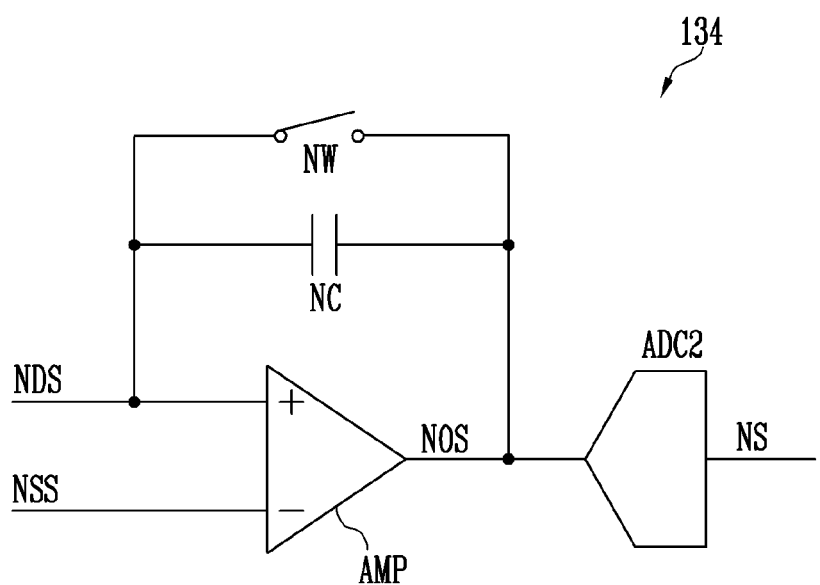
FIG. 34 is a diagram illustrating an example of a noise detector shown in FIG. 33.

FIG. 32 is a diagram illustrating that a display device operates in the second mode in accordance with an embodiment of the present disclosure. FIG. 33 is a diagram illustrating an example in which the display device shown in FIG. 32 operates in a noise sensing period NSP. FIG. 34 is a diagram illustrating an example of a noise detector 134 shown in FIG. 33.

FIG. 33 illustrates a case where a first touch is detected in the first row area RTA1. In FIG. 33, the first touch electrodes TX1 to TX48 to which a noise driving signal NDS is input are displayed by a gray color.

The display device in accordance with these embodiments is configured substantially identically to the display device 100 shown in FIG. 1, except that the display device includes the noise sensing period NSP in the second mode. Therefore, components identical or similar to those described above are designated by like reference numerals, and overlapping descriptions will be omitted.

Referring to FIGS. 1, 29, and 32 to 34, the touch panel driver 130 may include the noise detector 134 (e.g., a noise detection circuit).

The touch panel driver 130 may provide a noise driving signal NDS to at least one first touch electrode among the first touch electrodes TX17 to TX48 which are not disposed in the first row area RTA1.

The noise detector 134 may receive a noise sensing signal NSS corresponding to the noise driving signal NDS from at least one second touch electrode among the second touch electrodes RX1 to RX28, and detect noise of the at least one second touch electrode, based on the noise sensing signal NSS.

As shown in FIG. 34, the noise detector 134 may include an operational amplifier AMP, a noise capacitor NC, a noise switch NW, and a second analog-digital converter ADC2.

For example, the operational amplifier AMP may include a first input terminal receiving the noise driving signal NDS, a second input terminal receiving the noise sensing signal NSS, and an output terminal. The noise capacitor NC may include a first terminal connected to the first input terminal of the operational amplifier AMP and a second terminal connected to the output terminal of the operational amplifier AMP. The noise switch NW may include a first terminal connected to the first terminal of the noise capacitor NC and a second terminal connected to the second terminal of the noise capacitor NC. The second analog-digital converter ADC2 may receive a noise output signal NOS from the operational amplifier AMP, and output a noise signal NS by analog-to-digital converting the noise output signal NOS.

In an embodiment, the noise detector 134 may detect noise of the second touch electrodes RX1 to RX28, based on a difference between the noise driving signal NDS and the noise sensing signal NSS.

For example, just before or after the noise sensing period NSP is started, the noise switch NW may be turned on, and the noise capacitor NC may be initialized. In addition, the operational amplifier AMP may output, as the noise output signal NOS, the difference between the noise driving signal NDS and the noise sensing signal NSS. The noise signal NS generated by analog-to-digital converting the noise output signal NOS may be the noise of the second touch electrodes RX1 to RX28.

A deviation may exist between noise signals NS of the second touch electrodes RX1 to RX28. Also, the deviation may be noise. Therefore, the touch panel driver 130 may compensate for the touch sensing value (SV shown in FIG. 11) (i.e., removal of noise) so as to compensate for the deviation between the noise signals NS.

Since the second mode includes the second touch sensing period TSP2 which is relatively short, the second mode may further include the noise sensing period NSP in one frame period. In addition, detection of noise in the noise sensing period NSP can increase the accuracy of touch detection.

In this embodiment, it has been exemplified that the touch panel driver 130 provides the noise driving signal NDS to one first touch electrode (e.g., TX48). However, the present disclosure is not limited thereto. For example, the touch panel driver 130 may provide the noise driving signal NDS to any or all of the plurality of first touch electrodes TX1 to TX48.

In this embodiment, it has been exemplified that noise of the second touch electrodes RX1 to RX28 is removed. However, the present disclosure is not limited thereto. For example, in the present disclosure, noise of the first touch electrodes TX1 to TX48 may be removed using the same method as the method of removing the noise of the second touch electrodes RX1 to RX28.

Figure 35:
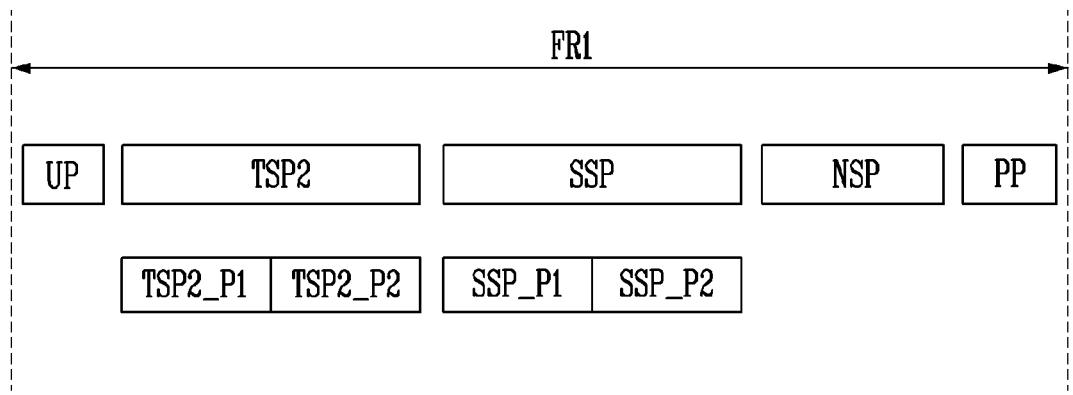
FIG. 35 is a diagram illustrating that a display device operates in the second mode in accordance with an embodiment of the present disclosure.

FIG. 35 is a diagram illustrating that a display device operates in the second mode in accordance with an embodiment of the present disclosure.

The display device in accordance with these embodiments is configured substantially identically to the display device 100 shown in FIG. 1, except that the display device includes a self-sensing period SSP and a noise sensing period NSP in the second mode. Therefore, components identical or similar to those described above are designated by like reference numerals, and overlapping descriptions will be omitted.

Referring to FIG. 35, a first frame period FR1 of the second mode includes a second touch sensing period TSP2, a second touch sensing period SSP, and a noise sensing period NSP. However, the self-sensing period SSP has been described with reference to FIG. 31, and the noise sensing period NSP has been described with reference to FIGS. 32 to 34. Therefore, overlapping descriptions will be omitted.

FIG. 36 is a flowchart illustrating a method of driving a display device in accordance with an embodiment of the present disclosure.

Referring to FIG. 36, the method of driving the display device includes providing touch driving signals to first touch electrodes disposed in a touch area of a touch panel in a first touch sensing period of a first mode (S100), receiving touch sensing signals corresponding to the touch driving signals from second touch electrodes in the first touch sensing period (S200), generating a touch sensing value, based on at least two of the touch sensing signals in the first touch sensing period (S300), detecting a first touch of a first object, based on the touch sensing value in the first touch sensing period (S400), operating in a second mode when the first touch is detected (S500), providing touch driving signals to first touch electrodes disposed in a first row area of the touch area in which the first touch is detected in a second touch sensing period of the second mode (S600), receiving touch sensing signals corresponding to the touch driving signals from the second touch electrodes in the second touch sensing period (S700), generating a touch sensing value, based on at least two of the touch sensing signals in the second touch sensing period (S800), and detecting the first touch of the first object, based on the touch sensing value in the second touch sensing period (S900).

In an embodiment, in the method shown in FIG. 36, touch driving signals may be provided to a first portion of the first touch electrodes disposed in the first row area in a first period of the second touch sensing period, and touch driving signals may be provided to a second portion different from the first portion of the first touch electrodes disposed in the first row area in a second period of the second touch sensing period. For example, the second period may occur after the first period.

In an embodiment, a first frame period of the first mode may include an uplink period and a first touch sensing period, and a second frame period subsequent to the first frame of the first mode may include a processing period in which a touch sensing value is processed.

In an embodiment, a first frame period of the second mode may include an uplink period, a second touch sensing period, and a processing period in which a touch sensing value is processed.

The present disclosure can be applied to display devices and electronic devices including the same. For example, the present disclosure can be applied to digital televisions (TVs), three-dimensional (3D) TVs, mobile phones, smart phones, tablet computers, virtual reality (VR) devices, personal computers (PCs), home appliances, notebook computers, personal digital assistants (PDAs), personal media players (PMPs), digital cameras, music players, portable game consoles, navigation systems, and the like.

In the display device in accordance with the present disclosure, a touch sensing value is generated based on at least two touch sensing signals, so that the influence of noise generated in the touch sensing signals can be reduced, and the accuracy of touch detection can be increased.

In the display device in accordance with the present disclosure, touch driving signals are provided to first touch electrodes disposed in an area in which a touch is detected in the second mode, so that the touch report rate can become high, and the response speed to a touch can be increased.

Example embodiments have been disclosed herein, and although specific terms are employed, they are used and are to be interpreted in a generic and descriptive sense only and not for purpose of limitation. In some instances, as would be apparent to one of ordinary skill in the art at the time of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
a touch panel including a touch area including first touch electrodes and second touch electrodes, wherein the touch area is divided into a plurality of row areas each including a subset of the first touch electrodes arranged in at least one entire row of a display area of the display device; and
a touch panel driver configured to provide touch driving signals to the first touch electrodes, receive touch sensing signals corresponding to the touch driving signals from the second touch electrodes, generate a touch sensing value based on at least two of the touch sensing signals received from the touch area, and detect a first touch of a first object based on the touch sensing value, wherein the touch panel driver provides the touch driving signals to all of the first touch electrodes in a first touch sensing period of a first mode, operates in a second mode when the first touch is detected, provides the touch driving signals to the first touch electrodes disposed in a first row area among the row areas in a second touch sensing period of the second mode, and does not provide the touch driving signals to the first touch electrodes disposed outside the first row area in the second touch sensing period of the second mode.

2. The display device of claim 1, wherein the touch panel driver: provides the touch driving signals to a first portion of the first touch electrodes in a first period of the first touch sensing period; and provides the touch driving signals to a second portion different from the first portion of the first touch electrodes in a second period of the first touch sensing period different from the first period.

3. The display device of claim 2, wherein the touch panel driver: sequentially provides the touch driving signals to the first portion of the first touch electrodes disposed in the first row area and the first portion of the first touch electrodes disposed in a second row area different from the first row area in the first period of the first touch sensing period; and sequentially provides the touch driving signals to the second portion of the first touch electrodes disposed in the first row area and the second portion of the first touch electrodes disposed in the second row area in the second period of the first touch sensing period.

4. The display device of claim 1, wherein a first frame period of the first mode includes an uplink period and the first touch sensing period, and wherein a second frame period subsequent to the first frame period of the first mode includes a processing period in which the touch sensing value is processed.

5. The display device of claim 4, wherein the touch panel driver detects a second touch of a second object in the uplink period.

6. The display device of claim 5, wherein the touch panel driver receives an uplink sensing signal corresponding to an output signal output by the second object from at least one of the first touch electrodes and the second touch electrodes, and detects the second touch of the second object, based on the uplink sensing signal.

7. The display device of claim 1, wherein the touch panel driver: provides the touch driving signals to a first portion of the first touch electrodes disposed in the first row area in a first period of the second touch sensing period; and provides the touch driving signals to a second portion different from the first portion of the first touch electrodes disposed in the first row area in a second period of the second touch sensing period different from the first period.

8. The display device of claim 7, wherein the touch panel driver: sequentially provides the touch driving signals to the first portion of the first touch electrodes disposed in a (1-1)th row area included in the first row area and the first portion of the first touch electrodes disposed in a (1-2)th row area different from the (1-1)th row area, which is included in the first row area, in the first period of the second touch sensing period; and sequentially provides the touch driving signals to the second portion of the first touch electrodes disposed in the (1-1)th row area and the second portion of the first touch electrodes disposed in the (1-2)th row area in the second period of the second touch sensing period.

9. The display device of claim 1, wherein a first frame period of the second mode includes an uplink period, the second touch sensing period, and a processing period in which the touch sensing value is processed.

10. The display device of claim 1, wherein a number of the first touch electrodes simultaneously receiving the touch driving signals in the second touch sensing period is smaller than a number of the first touch electrodes simultaneously receiving the touch driving signals in the first touch sensing period.

11. The display device of claim 1, wherein a first frame period of the second mode includes the second touch sensing period and a self-sensing period, and wherein the touch panel driver provides self-sensing signals to the first touch electrodes disposed in the first row area and the second touch electrodes disposed in a first column area of the touch area in which the first touch is detected in the self-sensing period, and detects the first touch of the first object based on a variation of the self-sensing signals.

12. The display device of claim 11, wherein the touch panel driver:
provides the self-sensing signals to the first touch electrodes disposed in the first row area in a first period of the self-sensing period; and
provides the self-sensing signals to the second touch electrodes disposed in the first column area in a second period of the self-sensing period different from the first period.

13. The display device of claim 1, wherein a first frame period of the second mode includes a noise sensing period, and wherein the touch panel driver provides a noise driving signal to at least one first touch electrode among the first touch electrodes which are not disposed in the first row area, receives a noise sensing signal corresponding to the noise driving signal from at least one second touch electrode among the second touch electrodes, and detects noise of the at least one second touch electrode, based on the noise sensing signal.

14. The display device of claim 13, wherein the touch panel driver detects the noise of the at least one second touch electrode, based on a difference between the noise driving signal and the noise sensing signal.

15. The display device of claim 1, wherein the detection of the first touch of the first object is a detection of a touch corresponding to a drawing operation.

16. An electronic device comprising:
a display device, comprising:
a touch panel including a touch area including first touch electrodes and second touch electrodes; and
a touch panel driver configured to perform self-capacitance-based touch detection by providing self-sensing signals to the first touch electrodes and the second touch electrodes, detect a first touch of a first object based on a variation of the self-sensing signals, provide touch driving signals to the first touch electrodes, receive touch sensing signals corresponding to the touch driving signals from the second touch electrodes, generate a touch sensing value based on at least two of the touch sensing signals, and detect the first touch, based on the touch sensing value,
wherein the touch panel driver provides the self-sensing signals to the first touch electrodes and the second touch electrodes of the touch area in a self-sensing period of a first mode, operates in a second mode in response to detecting the first touch, and provides the touch driving signals to the first touch electrodes disposed in a first row area of the touch area in which the first touch is detected in a second touch sensing period of the second mode.

17. The electronic device of claim 16, wherein the touch panel driver: provides the self-sensing signals to the first touch electrodes in a first period of the self-sensing period; and provides the self-sensing signals to the second touch electrodes in a second period of the self-sensing period.

18. A method of driving a display device, the method comprising:
dividing a touch area of a touch panel into a plurality of row areas, each including a subset of first touch electrodes arranged in at least one entire row of a display area of the display device;
providing touch driving signals to first touch electrodes disposed in the touch area of the touch panel in a first touch sensing period of a first mode;
receiving touch sensing signals corresponding to the touch driving signals from second touch electrodes in the first touch sensing period;
generating a touch sensing value, based on at least two of the touch sensing signals in the first touch sensing period;
detecting a first touch of a first object, based on the touch sensing value in the first touch sensing period;
operating in a second mode when the first touch is detected;
providing the touch driving signals to the first touch electrodes disposed in a first row area among the row areas in which the first touch is detected in a second touch sensing period of the second mode; and
not providing the touch driving signals to the first touch electrodes disposed outside the first row area in the second touch sensing period of the second mode.

19. The method of claim 18, wherein the providing of the touch driving signals in the second touch sensing period comprises:
- providing the touch driving signals to a first portion of the first touch electrodes disposed in the first row area in a first period of the second touch sensing period; and
- providing the touch driving signals to a second portion different from the first portion of the first touch electrodes disposed in the first row area in a second period of the second touch sensing period different from the first period.

20. The method of claim 18, wherein a first frame period of the first mode includes an uplink period and the first touch sensing period, and wherein a second frame period subsequent to the first frame of the first mode includes a processing period in which the touch sensing value is processed.

21. The method of claim 18, wherein a first frame period of the second mode includes an uplink period, the second touch sensing period, and a processing period in which the touch sensing value is processed.

\* \* \* \* \*